United States Patent
Fan et al.

(10) Patent No.: US 10,019,494 B2
(45) Date of Patent: *Jul. 10, 2018

(54) SUGGESTING ALTERNATE DATA MAPPINGS FOR CHARTS

(71) Applicant: Microsoft Technology Licensing, LLC, Redmond, WA (US)

(72) Inventors: Kevin Fan, Bellevue, WA (US); Benjamin Edward Rampson, Woodinville, WA (US); Nick Chiang, Redmond, WA (US); Robin Wakefield, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/811,090

(22) Filed: Jul. 28, 2015

(65) Prior Publication Data
US 2016/0026695 A1    Jan. 28, 2016

Related U.S. Application Data

(63) Continuation of application No. 13/272,522, filed on Oct. 13, 2011, now Pat. No. 9,135,233.

(51) Int. Cl.
*G06F 17/30* (2006.01)
*G06F 7/00* (2006.01)
(Continued)

(52) U.S. Cl.
CPC ...... *G06F 17/30554* (2013.01); *G06F 17/246* (2013.01); *G06F 17/3005* (2013.01);
(Continued)

(58) Field of Classification Search
CPC ............... G06F 17/246; G06F 17/3005; G06F 17/30554; G06F 17/30716
See application file for complete search history.

(56) References Cited

U.S. PATENT DOCUMENTS 5,040,131 A    8/1991    Torres
5,461,708 A    10/1995    Kahn
(Continued)

FOREIGN PATENT DOCUMENTS

CN    1755599 A    4/2006
CN    1790325 A    6/2006
(Continued)

OTHER PUBLICATIONS

"Chart Component .NET ver. 4.4", Printed on: Jul. 27, 2011, Available at: http://www.chartcomponent.com/Pages/Home/Introduction.htm.
(Continued)

*Primary Examiner* — Kannan Shanmugasundaram

(57) ABSTRACT

Data mapping alternatives for creating a visual representation of a set of data are presented. A set of data is identified for analysis. The identified set of data and properties associated with the identified set of data are analyzed. Based on the analysis, data mapping alternatives for the identified set of data are determined. The determined data mapping alternatives for the identified set of data are ranked. The determined data mapping alternatives are presented in an order according to the ranking of the determined data mapping alternatives.

20 Claims, 27 Drawing Sheets

(51) Int. Cl.
*G06F 17/24* (2006.01)
*G06F 17/00* (2006.01)

(52) U.S. Cl.
CPC .... *G06F 17/3053* (2013.01); *G06F 17/30315* (2013.01); *G06F 17/30716* (2013.01)

(56) References Cited

U.S. PATENT DOCUMENTS

| | | | |
|---|---|---|---|
| 5,495,565 | A | 2/1996 | Millard et al. |
| 5,581,677 | A | 12/1996 | Myers et al. |
| 5,844,572 | A | 12/1998 | Schott |
| 5,894,311 | A | 4/1999 | Jackson |
| 6,278,450 | B1 | 8/2001 | Arcuri et al. |
| 6,496,832 | B2 | 12/2002 | Chi et al. |
| 6,570,587 | B1 | 5/2003 | Efrat |
| 7,002,580 | B1 | 2/2006 | Aggala et al. |
| 7,092,929 | B1 | 8/2006 | Dvorak et al. |
| 7,107,519 | B1 | 9/2006 | Webster et al. |
| 7,127,672 | B1 | 10/2006 | Patterson et al. |
| 7,231,593 | B1 | 6/2007 | Raja et al. |
| 7,292,244 | B2 | 11/2007 | Vafiadis et al. |
| 7,444,599 | B1 | 10/2008 | Chaudhri et al. |
| 7,627,812 | B2 | 12/2009 | Chamberlain et al. |
| 7,849,395 | B2 | 12/2010 | Ellis et al. |
| 7,853,877 | B2 | 12/2010 | Giesen et al. |
| 7,882,427 | B2 | 2/2011 | Raja et al. |
| 7,908,567 | B1 | 3/2011 | Bhojan |
| 7,949,953 | B2 | 5/2011 | Bhatt et al. |
| 8,132,106 | B2 | 3/2012 | Low et al. |
| 8,250,486 | B2 | 8/2012 | Lentz |
| 8,255,789 | B2 | 8/2012 | Berger et al. |
| 8,549,392 | B2 | 10/2013 | Simkhay et al. |
| 8,612,380 | B2 | 12/2013 | Kleppner et al. |
| 8,793,567 | B2 | 7/2014 | Velingkar et al. |
| 9,135,233 | B2 | 9/2015 | Fan et al. |
| 2003/0071814 | A1* | 4/2003 | Jou .......................... G06F 9/542 345/440 |
| 2003/0154443 | A1 | 8/2003 | Papierniak et al. |
| 2003/0195780 | A1 | 10/2003 | Arora et al. |
| 2004/0015783 | A1* | 1/2004 | Lennon ............. G06F 17/30389 715/235 |
| 2004/0181543 | A1* | 9/2004 | Wu ................... G06F 17/30572 707/999.1 |
| 2004/0230471 | A1 | 11/2004 | Putnam et al. |
| 2005/0010557 | A1* | 1/2005 | Dettinger .......... G06F 17/30398 |
| 2005/0071325 | A1 | 3/2005 | Bem |
| 2005/0097465 | A1 | 5/2005 | Giesen et al. |
| 2005/0204304 | A1 | 9/2005 | Garcia et al. |
| 2005/0234960 | A1 | 10/2005 | Chickering et al. |
| 2006/0074866 | A1 | 4/2006 | Chamberlain et al. |
| 2006/0167911 | A1 | 7/2006 | Le et al. |
| 2006/0218483 | A1 | 9/2006 | Weitzman et al. |
| 2006/0285868 | A1 | 12/2006 | Holmes |
| 2007/0024490 | A1 | 2/2007 | Carter et al. |
| 2007/0061369 | A1 | 3/2007 | Folting et al. |
| 2007/0061611 | A1 | 3/2007 | Mackinlay et al. |
| 2007/0074130 | A1 | 3/2007 | Folting et al. |
| 2007/0101299 | A1 | 5/2007 | Shaw et al. |
| 2007/0260970 | A1 | 11/2007 | Dorwart |
| 2008/0005677 | A1* | 1/2008 | Thompson ............. G06Q 10/00 715/744 |
| 2008/0022562 | A1 | 1/2008 | Manis |
| 2008/0082521 | A1 | 4/2008 | Danielson et al. |
| 2008/0127052 | A1 | 5/2008 | Rostoker |
| 2008/0222562 | A1* | 9/2008 | Helfman ............... G06F 17/246 715/810 |
| 2008/0243784 | A1 | 10/2008 | Stading |
| 2008/0281783 | A1 | 11/2008 | Papkoff et al. |
| 2008/0288889 | A1 | 11/2008 | Hunt et al. |
| 2009/0044089 | A1 | 2/2009 | Gur et al. |
| 2009/0076974 | A1 | 3/2009 | Berg et al. |
| 2009/0096812 | A1 | 4/2009 | Boixel et al. |
| 2009/0110120 | A1 | 4/2009 | Salehi |
| 2009/0257673 | A1 | 10/2009 | Schweid |
| 2009/0282324 | A1 | 11/2009 | Patel |
| 2009/0287673 | A1* | 11/2009 | Chronister ........ G06F 17/30994 |
| 2009/0307207 | A1* | 12/2009 | Murray ............. G06F 17/30026 |
| 2009/0319897 | A1 | 12/2009 | Kotler et al. |
| 2010/0017872 | A1 | 1/2010 | Goertz et al. |
| 2010/0070448 | A1 | 3/2010 | Omoigui |
| 2010/0083086 | A1 | 4/2010 | Berger et al. |
| 2010/0107101 | A1 | 4/2010 | Shaw et al. |
| 2010/0205521 | A1 | 8/2010 | Folting |
| 2010/0214299 | A1 | 8/2010 | Robertson et al. |
| 2010/0228752 | A1 | 9/2010 | Folting et al. |
| 2010/0229122 | A1 | 9/2010 | McCormack et al. |
| 2011/0016425 | A1 | 1/2011 | Homburg et al. |
| 2011/0055722 | A1 | 3/2011 | Ludwig |
| 2011/0066488 | A1 | 3/2011 | Ludewig et al. |
| 2011/0087954 | A1 | 4/2011 | Dickerman et al. |
| 2011/0252032 | A1 | 10/2011 | Fitzgerald et al. |
| 2011/0276867 | A1 | 11/2011 | Machalek |
| 2011/0295871 | A1 | 12/2011 | Folting et al. |
| 2012/0023101 | A1 | 1/2012 | Heimendinger et al. |
| 2012/0159297 | A1 | 6/2012 | Peters |
| 2012/0166927 | A1 | 6/2012 | Shearer et al. |
| 2012/0192053 | A1 | 7/2012 | Waltenberger |
| 2013/0080444 | A1 | 3/2013 | Wakefield et al. |
| 2013/0086459 | A1 | 4/2013 | Folting et al. |
| 2013/0086460 | A1 | 4/2013 | Folting et al. |
| 2013/0124960 | A1 | 5/2013 | Velingkar et al. |
| 2013/0124989 | A1 | 5/2013 | Doan et al. |
| 2013/0145244 | A1 | 6/2013 | Rothschiller et al. |

FOREIGN PATENT DOCUMENTS

| | | |
|---|---|---|
| CN | 101253494 A | 8/2008 |
| CN | 101604243 | 12/2009 |
| CN | 101604243 A | 12/2009 |
| CN | 102027445 | 4/2011 |
| CN | 102027445 A | 4/2011 |
| EP | 863469 | 9/1998 |
| EP | 863469 A2 | 9/1998 |
| EP | 1286284 A1 | 2/2003 |
| JP | H 05-165893 | 7/1993 |
| JP | 2004028864 A | 1/2004 |

OTHER PUBLICATIONS

"OLAP Statistics & Reporting", Retrieved on: Sep. 2, 2011, Available at: https://www.assistmyteam.net/Olapstatisticsaccess/.

"Wikipedia talk: Collaboration to convert graphs to SVG", Published on: Jul. 27, 2011, Available at: https://en.wikipedia.org/wiki/Wikipedia_talk:Collaboration_to_convert_graphs_to_SVG.

"Final Office Action Received for U.S. Appl. No. 13/245,126", dated Jun. 11, 2013, 24 Pages.

"Final Office Action Received for U.S. Appl. No. 13/245,126", dated Jun. 25, 2015, 37 Pages.

"Non-Final Office Action Received for U.S. Appl. No. 13/245,126", dated Dec. 1, 2014, 15 Pages.

"Non-Final Office Action Received for U.S. Appl. No. 13/245,126", dated Jun. 13, 2014, 35 Pages.

"Non-Final Office Action Received for U.S. Appl. No. 13/245,126", dated Oct. 22, 2012, 18 Pages.

"Final Office Action Received for U.S. Appl. No. 13/272,522", dated Apr. 15, 2013, 22 Pages.

"Final Office Action Received for U.S. Appl. No. 13/272,522", dated Mar. 12, 2014, 16 Pages.

"Non-Final Office Action Received for U.S. Appl. No. 13/272,522", dated Sep. 26, 2013, 22 Pages.

"Non-Final Office Action Received for U.S. Appl. No. 13/272,522", dated Nov. 6, 2014, 20 Pages.

"Non-Final Office Action Received for U.S. Appl. No. 13/272,522", dated Oct. 24, 2012, 22 Pages.

"Notice of Allowance Issued in U.S. Appl. No. 13/272,522", dated Apr. 24, 2015, 5 Pages.

"Notice of Allowance Issued in U.S. Appl. No. 13/272,522", dated May 22, 2015, 4 Pages.

(56) References Cited

OTHER PUBLICATIONS

"Final Office Action Received for U.S. Appl. No. 13/293,288", dated May 1, 2015, 41 Pages.
"Final Office Action Received for U.S. Appl. No. 13/293,288", dated Sep. 10, 2014, 27 Pages.
"Non-Final Office Action Received for U.S. Appl. No. 13/293,288", dated Feb. 13, 2014, 35 Pages.
"Non-Final Office Action Received for U.S. Appl. No. 13/298,285", dated Nov. 4, 2013, 11 Pages.
"Final Office Action Received for U.S. Appl. No. 13/311,541", dated Sep. 6, 2013, 15 Pages.
"Non-Final Office Action Received for U.S. Appl. No. 13/311,541", dated Jan. 16, 2015, 19 Pages.
"Non-Final Office Action Received for U.S. Appl. No. 13/311,541", dated Mar. 19, 2013, 13 Pages.
"First Office Action and Search Report Received for Chinese Patent Application No. 201210362781.X", dated Jan. 7, 2015, 15 Pages.
"First Office Action and Search Report Issued in Chinese Patent Application No. 201210387253.X", dated Jan. 19, 2015, 12 Pages.
"Second Office Action Received for Chinese Patent Application No. 201210387253.X", dated Jul. 8, 2015, 6 Pages.
"First Office Action and Search Report Received for Chinese Patent Application No. 201210448502.1", dated Jan. 26, 2015, 13 Pages.
Doumont, et al., "Choosing the Right Graph", in IEEE Transactions on Professional Communication, vol. 45, Issue 1, Mar. 2002, pp. 1-6.
Gupta, Anil, "Excel Chart Advisor will Create and Suggest Charts for your Data", Published on: May 29, 2010, Available at: http://web.archive.org/web/20130821070725/http://am22tech.com/s/22/Blogs/post/2010/05/29/Excel-Chart-advisor-will-create-and-suggest-charts-for-your-data.aspx.
Helfman, et al., "Selecting the Best Graph Based on Data, Tasks, and User Roles", in Proceedings of UPA 2007 Conference on Patterns: Blueprints for Usability, Jun. 11, 2007, 10 Pages.
Jones, Brian, "Document Assembly Solution for SpreadsheetML", Retrieved on: Nov. 4, 2008, Available at: http://blogs.msdn.com/b/brian_jones/archive/2008/11/04/document-assembly-solution-for-spreadsheetml.aspx.
Klass, Glary, "Presenting Data: Tabular and graphic display of social indicators", Published on: Jul. 27, 2011, Available at: http://lilt.ilstu.edu/gmklass/pos138/datadisplay/sections/goodcharts.htm.
Marinuzzi, John, "PowerPivot for Excel 2010", Retrieved on: May 4, 2011, Available at: http://community.altiusconsulting.com.ourwindowsnetwork.com/blogs/altiustechblog/archive/2011/05/04/powerpivot-for-excel-2010.aspx.
"International Search Report & Written Opinion Received for PCT Patent Application No. PCT/US2012/057159", dated Feb. 28, 2013, 11 Pages.
"International Search Report & Written Opinion Received for PCT Patent Application No. PCT/US2012/066489", dated Feb. 26, 2013, 9 Pages.
Mayes; "Office Labs Chart Advisor for Excel"; TVMCalcs.com; Aug. 25, 2008; Retrieved from the internet: http://www.tvmcalcs.com/index.php/blog/comments/office_labs_chart_advisor_for_excel; 6 pgs.
Mysticgeek; "Create Charts in Excel 2007 the Easy Way with Chart Advisor"; How-to-Geek; Sep. 22, 2009; retrieved from the internet: http://howtogeek.com/howto/4136/create-charts-in-excel-2007-the-easy-way-with-chart-advisor; 10 pgs.
Chinese Office Action and Search Report Issued in Patent Application No. 201210514600.0, dated Sep. 30, 2014, 14 Pages. (Not at M&G).
Chinese Second Office Action Issued in Patent Application No. 201210514600.0, dated Jun. 10, 2015, 8 Pages.
EP Communication dated Dec. 2, 2015 in Appln No. PCT/US2012/057159, 10 pgs.
U.S. Office Action dated Jul. 27, 2015 cited in U.S. Appl. No. 13/311,541, 21 pgs. (Not at M&G).
U.S. Office Action dated Dec. 3, 2015 cited in U.S. Appl. No. 13/293,288, 23 pgs.
Chinese Second Office Action Issued in Chinese Patent Application No. 201210448502.1, dated Sep. 30, 2015, 11 Pages.
Chinese Final Office Action Issued in Chinese Patent Application No. 201210448502.1, dated Mar. 2, 2016, 9 Pages.
Chinese Notice of Allowance Issued in Patent Application No. 201210387253.X, dated Nov. 5, 2015, 4 Pages.
Chinese Third Office Action dated Dec. 18, 2015 in Appln No. 201210514600.0, 12 pgs.
EP Extended Search Report dated Aug. 6, 2015 in Appln No. PCT/US2012/066489, 10 pgs.
Chinese Notice of Allowance Issued in Patent Application No. 201210362781.X, dated Aug. 20, 2015, 4 Pages.
U.S. Appl. No. 13/293,288, Office Action dated Jun. 24, 2016, 23 pages.
Japanese Office Action in Application 2014-533655, dated Jul. 1, 2016, 8 pages.
U.S. Appl. No. 13/293,288, Office Action dated Jan. 13, 2017, 19 pages.
U.S. Appl. No. 13/293,288, Office Action dated Aug. 10, 2017, 19 pages.
U.S. Appl. No. 13/293,288, Office Action dated Jan. 2, 2018, 17 pages.

\* cited by examiner

| | header1 | header2 | header3 | header4 | header5 | HeaderN | |
|---|---|---|---|---|---|---|---|
| month1 | xx | xx | xx | x.x | xxx | xx | |
| month2 | xx | xx | xx | x.x | xxx | xx | |
| month3 | xx | xx | xx | x.x | xxx | xx | |
| month4 | xx | xx | xx | x.x | xxx | xx | |
| month | xx | xx | xx | x.x | xxx | xx | |
| month | xx | xx | xx | x.x | xxx | xx | |
| monthN | xx | xx | xx | x.x | xxx | xx | |
| | | | | | | | |
| | | | | | | | |

| A | C | G | ### | ### | U |
|---|---|---|-----|-----|---|
|   |   | H | ### | ### | V |
|   | D | I | ### | ### | W |
| B | E | J | ### | ### | X |
|   | F | K | ### | ### | Y |
|   |   | L | ### | ### | Z |
| Category | Category | Category | Value Series | Value Series | Category |

1010 (Category columns)     1020 (Category column)

FIG. 10

1200
Dataset: 1210
| Year | Budget | Actual |
|------|--------|--------|
| 2001 | 20 | 38 |
| 2002 | 19 | 16 |
| 2003 | 28 | 71 |
| 2004 | 64 | 16 |
1220   1230
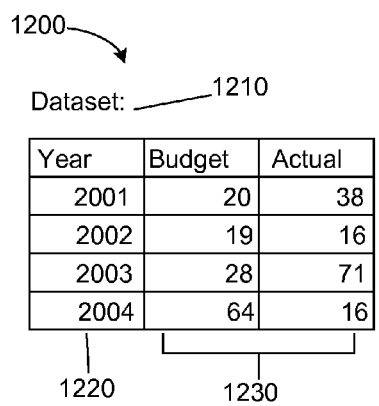
Fig. 12a
Chart output before algorithm:
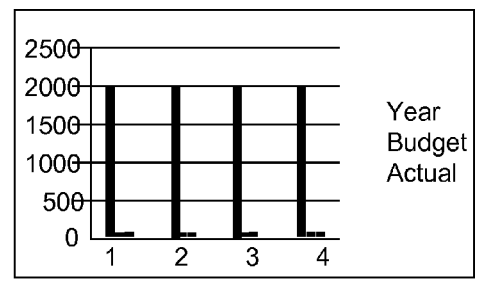
Fig. 12b
Algorithm output:
1240
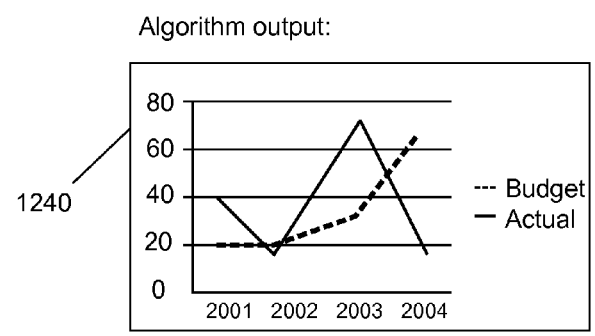
1250
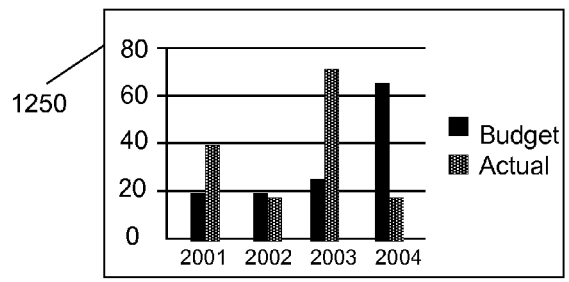
Fig. 12c

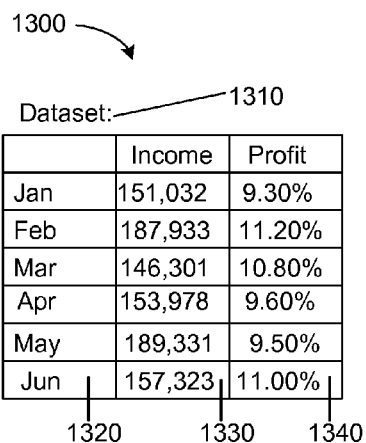
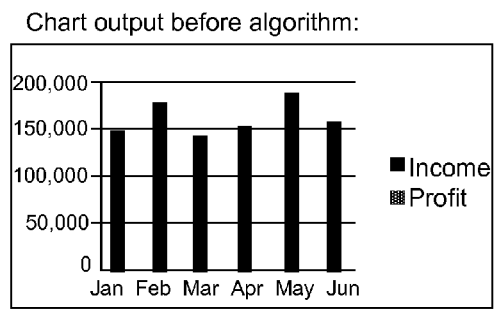
Fig. 13a                                  Fig. 13b
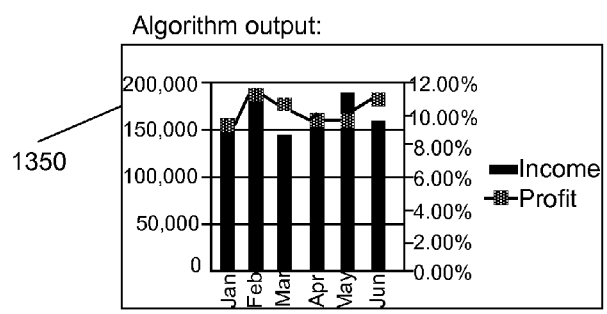
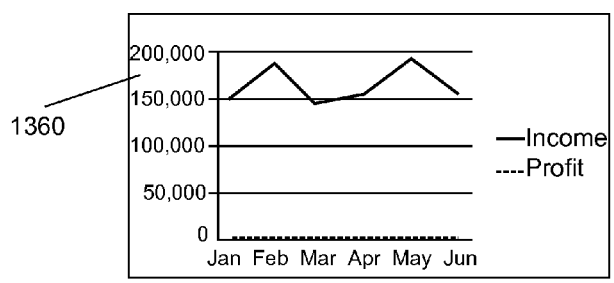
Fig. 13c

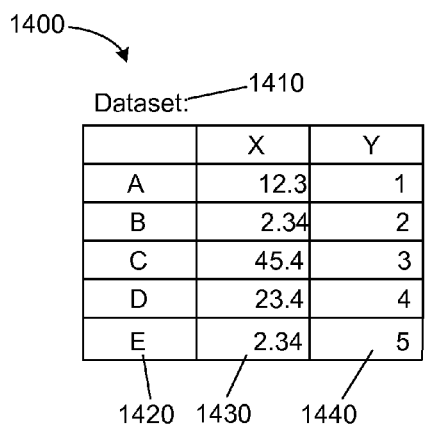
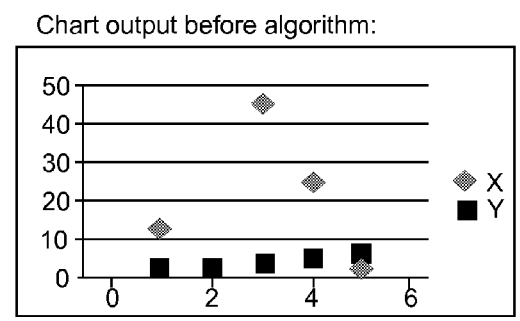
Fig. 14a    Fig. 14b
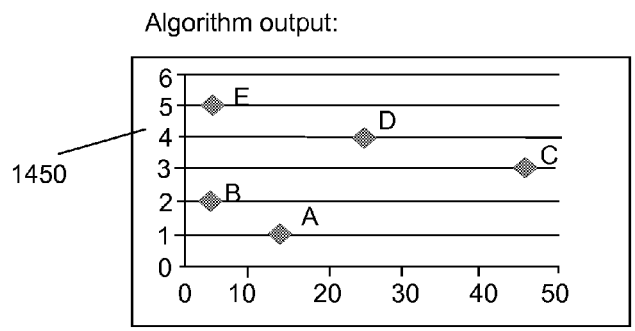
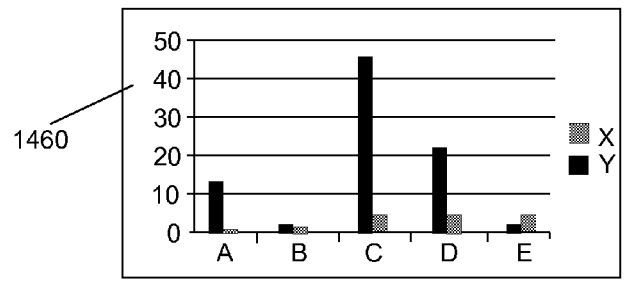
Fig. 14c

1500

1510 — Categories

| Rules | Score |
|---|---|
| If column left most | 1 |
| If null count of column is 0 | 1 |
| If it is date series | |
|     If count of distinct values is between | |
|         xx and xx | 6-9 |
|     If column is sorted | -4 |
| If column is strings | |
|     Is Day of Week series | 3 |
|     Month series | 4 |
|     Is linear with leading string | 2 |
|     Other | 1 |
| If column is a numeric series | |
|     Year series | 6-8 |
|     Not year series | 1-4 |

(1520, 1530, 1540)

1550 — Value Series

| Rules | Score |
|---|---|
| If percentage of null value is | |
|     between .7 and .9 | -3 |
|     between .5 and .7 | -2 |
| If it is a numeric series | |
|     Sums to 1 or 100 | -1 |
|     a total series | 1 |
|     no null values | 6 |
|     null values | 4 |
| If column's numeric group is 1 | -2 |

Chart Selection Rule Criteria

| | Category | Legend | Values | Data Density | Variables | Uniqueness Density |
|---|---|---|---|---|---|---|
| Line | * | * | * | | | |
| Area | * | * | * | | | |
| Surface | * | * | * | | | |
| Bubble | * | | * | * | | * |
| Scatter | * | | * | * | | * |
| Clustered Bar | * | * | * | * | | |
| Stacked Column | * | * | * | * | | |
| Stacked Bar | * | * | * | * | | |
| Radar | * | * | * | * | | |
| Stacked Col Mult Val | * | | * | * | | |
| Stacked Bar Mult Val | * | | * | * | | |
| Doughnut | * | | * | * | | |
| Stacked 100% Col | * | | * | * | | |
| Stacked 100% Bar | * | | * | * | | |
| Pie | * | | * | * | | |
| Clustered Column | * | * | * | * | * | |
| Stock | * | | | | | |

| Sale ID | Date | Customer | Product | Qty | Price | Fruit | Farm |
|---|---|---|---|---|---|---|---|
| 1 | 1/4/2011 | Dave | Red Delicious | 15 | $100.00 | Apple | Berry |
| 2 | 1/4/2011 | Cathy | Lemon | 16 | $240.00 | Citrus | Key Farms |
| 3 | 1/4/2011 | Dave | Hawaiin Yellow | 7 | $140.00 | Banana | Lana Plantations |
| 4 | 1/5/2011 | Ellen | Icy Crunch | 5 | $60.00 | Pear | Berry |
| 5 | 1/5/2011 | Adam | Red Delicious | 11 | $117.00 | Apple | Berry |
| 6 | 1/6/2011 | Barry | Lemon | 9 | $98.00 | Citrus | Key Farms |

1810

PivotTable Suggestions

1820

| Raw Labels | Sum of Qty |
|---|---|
| Adam | 64 |
| Barry | 76 |
| Cathy | 73 |
| Dave | 78 |
| Ellen | 46 |
| Grand Total | 337 |

1830

| Raw Labels | Sum of Qty |
|---|---|
| Apple | 82 |
| Banana | 64 |
| Citrus | 57 |
| Pear | 78 |
| Grand Total | 353 |

1840

| Raw Labels | Sum of Qty |
|---|---|
| Berry | 322 |
| Key Farms | 92 |
| Knott | 73 |
| Lana Plantations | 64 |
| Grand Total | 551 |

| Raw Labels | Sum of Qty |
|---|---|
| Adam | 64 |
| Barry | 76 |
| Cathy | 73 |
| Dave | 78 |
| Ellen | 46 |
| Grand Total | 337 |

1850

OK   Cancel

Fig. 18

SUGGESTING ALTERNATE DATA MAPPINGS FOR CHARTS

CROSS-REFERENCE TO RELATED APPLICATIONS

This application is a continuation application and claims priority to U.S. patent application Ser. No. 13/272,522, filed Oct. 13, 2011, entitled "SUGGESTING ALTERNATE DATA MAPPINGS FOR CHARTS," now issued U.S. Pat. No. 9,135,233 which application is incorporated herein by reference in its entirety. This application is related to application Ser. No. 13/245,126 entitled "Chart Recommendations" filed Sep. 26, 2011, which is incorporated herein by reference.

BACKGROUND

Data analytics is used in many industries to allow companies and organization to make better business decisions and in the sciences to model and verify theories. There are many tools available for processing and managing data. Examples of data processing and management tools include database tools, visual tool for creating, analyzing, and communicating decision models, spreadsheet programs, etc. Thus, there are many tools that may use tables or other grid data sources. Moreover, visualization is often needed for different types of data sources, whether they be spreadsheet data, data in a CSV file, data in a SQL table, data in some other data base, data in a cube, or data in some other structured electronic storage container.

A spreadsheet is one example of a grid data source that may be used to create a table which displays numbers in rows and columns. Spreadsheets can be used for a variety of purposes. For example, spreadsheets are often used in accounting, budgeting, charting/graphing, financial analysis, scientific applications, etc. Spreadsheets can exist in paper format, but are more commonly today provided using electronic spreadsheet tools. Electronic spreadsheets are frequently used to manipulate, condense and organize vast collections of data. Moreover, spreadsheets have the ability to re-calculate the entire spreadsheet automatically after a change to a single cell is made, which saves save users a tremendous amount of time. While the data analytic tools, such as the spreadsheet, have become ubiquitous in every organization and will likely remain so, the quality of information visualization has not kept pace.

After data has been collected and arranged or entered into a tool, such as a spreadsheet, compelling stories based on the data cannot be communicated effectively without using charts and other visualizations. In information visualization, as the volume and complexity of the data increases, researchers require more powerful visualization tools that enable them to more effectively explore multidimensional datasets. The most common visualization involves the use of charts to convey information about data. However, a given data type may have several different visual representations at the user's disposal.

Currently, users may select the data to include in a chart, and then select the chart type. This may be frustrating to users that do not understand the difference between the choices available. Thus, a user that does not know what chart type is the most suitable for what the user wants to convey may create charts based on what the user thinks they like or based on what the user is familiar with. As a result, the chart or visualization may not convey the information as intended or in a most useful manner because the data may not be properly mapped to the chart's construct. Today, there is not a chart recommendation tool that provides the user with optimal chart choices in a ranked order based on an analysis of the data or that guides users to make better choices in creating visualizations.

SUMMARY OF THE INVENTION

To overcome the limitations described above, and to overcome other limitations that become apparent upon reading and understanding the present specification, embodiments for providing chart recommendations are disclosed.

The above described problems are solved by a process that analyzes the user's data as well as the chart type. The process suggests different representations of the chart based on alternative mappings of the data to the chart's constructs. These alternate mapping suggestions are then presented to the user in a rich manner which allows for easy selection of the desired chart both within the initial chart insertion experience as well as after a chart is inserted.

An embodiment includes a method for presenting data mapping alternatives for creating a visual representation of a set of data is disclosed. The method includes identifying a set of data for analysis, analyzing the identified set of data and properties associated with the identified set of data, based on the analysis, determining data mapping alternatives for the identified set of data, ranking the determined data mapping alternatives for the identified set of data and presenting the determined data mapping alternatives in an order according to the ranking of the determined data mapping alternatives.

In another embodiment, a chart recommendation device is disclosed. The chart recommendation device includes memory for storing data and a processor, coupled to the memory, the processor configured for identifying a set of data for analysis, analyzing the identified set of data and properties associated with the identified set of data, based on the analysis, determining data mapping alternatives for the identified set of data, ranking the determined data mapping alternatives for the identified set of data and presenting the determined data mapping alternatives in an order according to the ranking of the determined data mapping alternatives.

In another embodiment, a computer-readable memory device with instructions stored thereon for providing chart recommendations is disclosed. The instructions include identifying a set of data for analysis, analyzing the identified set of data and properties associated with the identified set of data, based on the analysis, determining data mapping alternatives for the identified set of data, ranking the determined data mapping alternatives for the identified set of data and presenting the determined data mapping alternatives in an order according to the ranking of the determined data mapping alternatives.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Referring now to the drawings in which like reference numbers represent corresponding parts throughout:

FIG. 1 represents a table in a spreadsheet application that a user may select a dataset from for chart suggestions according to one embodiment;

FIG. 10 shows hierarchical categories according to one embodiment;

FIGS. 12a-c show an example of a header on a category series according to one embodiment;

FIGS. 13a-c show an example of composite data with different numeric groups according to one embodiment;

FIGS. 14a-c show an example of scatter charts according to one embodiment;

FIG. 15 provides scoring examples for possible categories and value series attributes for line and area charts according to one embodiment;

FIG. 16 provides guidelines for chart selection based on attributes and characterization of data according to one embodiment;

FIG. 18 shows PivotTable suggestions for a dataset that contains aggregates according to one embodiment;

DETAILED DESCRIPTION

Embodiments of the present invention are directed to providing chart recommendations to users desiring a visualization of data.

FIG. 1 represents a table 100 in a spreadsheet application that a user may select a dataset from for chart suggestions according to one embodiment. Those skilled in the art recognize that there are many examples of data processing and management tools, which may include database tools, visual tool for creating, analyzing, and communicating decision models, spreadsheet programs, etc. Further, there are other tools that may use tables or other grid data sources. A spreadsheet is one example of a grid data source that may be used to create a table. Thus, those skilled in the art will recognize that the embodiments discussed herein are not meant to be limited to spreadsheets or any other particular method of presenting data.

In FIG. 1, the chart recommendation process tries to heuristically determine a set of appropriate chart suggestions for a user provided dataset 110, taking into account different chart types, data mappings and chart layouts, based on the given data.

Figure 2:
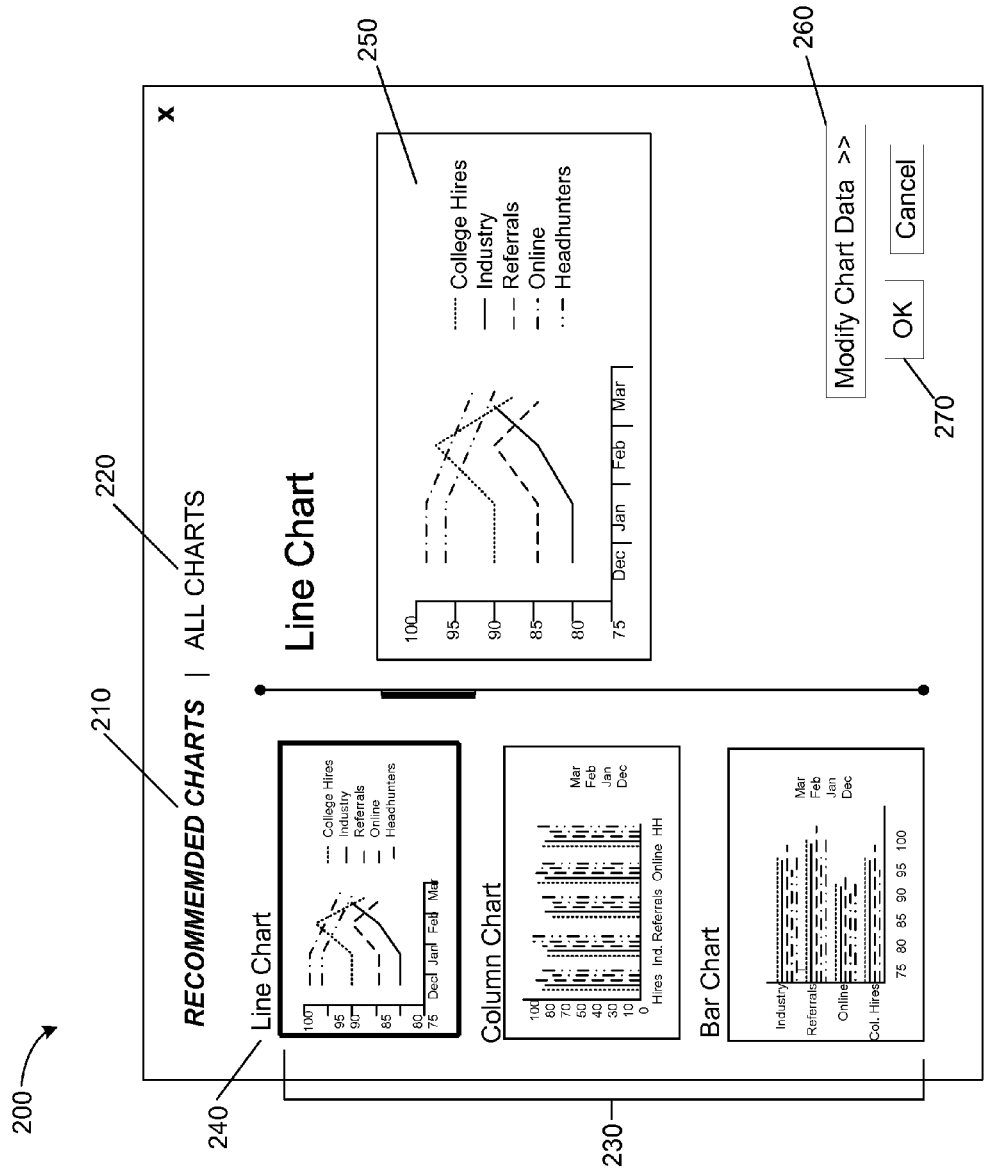
FIG. 2 provides a "Recommended Charts" pane according to one embodiment.

FIG. 2 provides a "Recommended Charts" pane 200 according to one embodiment. The insect chart feature may consist of two distinct panes, the recommendations pane 210 and the all charts pane 220. The recommendations pane 210, as shown in FIG. 2, contains a scrollable list of recommended charts 230 provided by the chart recommendation process. When the user selects a chart 240 from the list of recommended charts 230, e.g., the line chart, the chart selection is displayed on screen 250. The user may modify the chart by selecting the button 260, or select the chart by clicking the OK button 270. Those skilled in the art recognize that embodiments are not meant to be limited to the user interface described herein, but that other user interfaces may be used without departing from the scope of the described embodiments.

Figure 3:
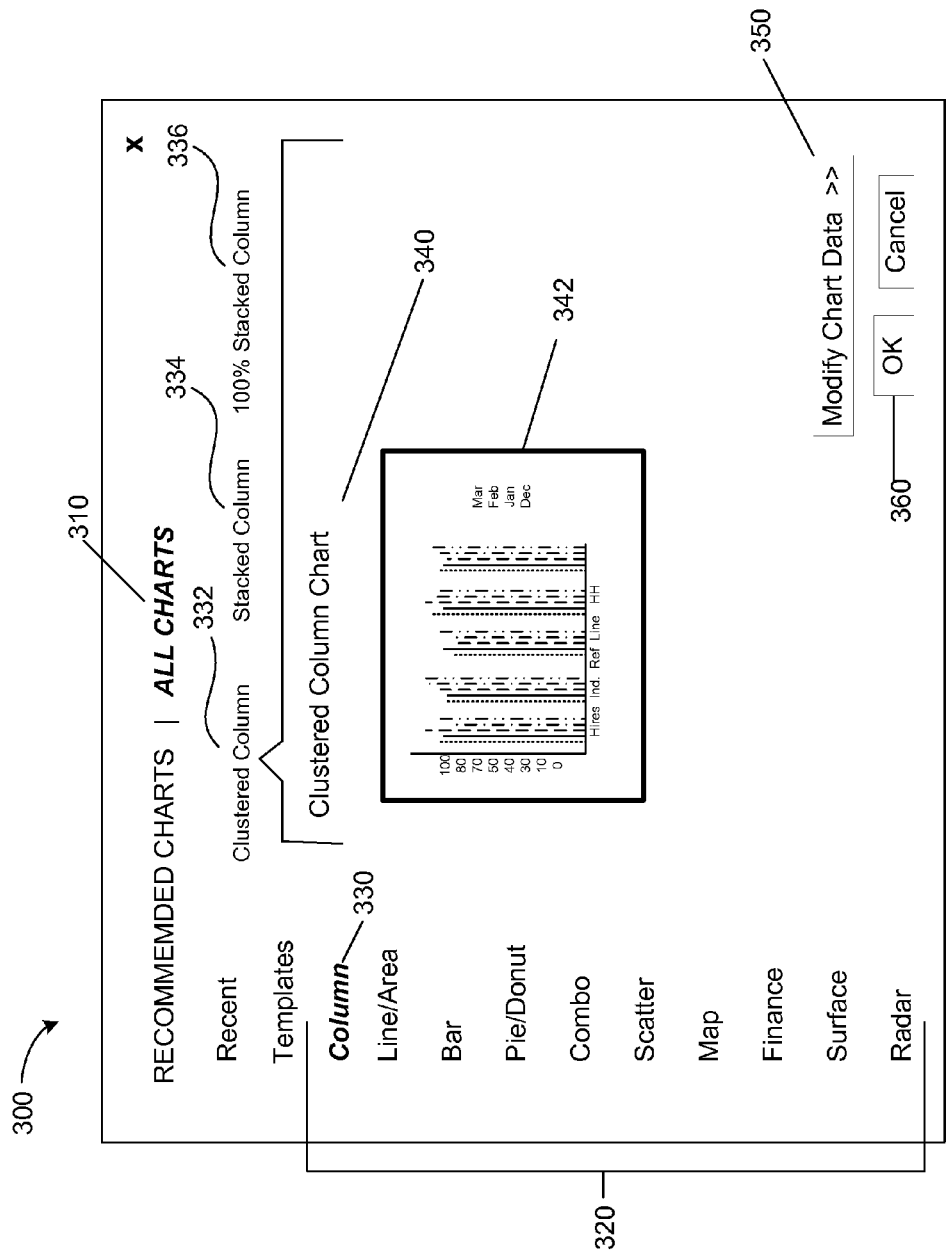
FIG. 3 provides an "All Charts" pane according to one embodiment.

FIG. 3 provides the "All Charts" pane 300 according to one embodiment. The All Charts pane 310 contains static, selectable chart types 320. The user may select a chart type from the scrollable list of all chart types 320. For clarity, FIG. 3 only shows one chart 343. However, the All Charts pane 310 may provide multiple suggestions (of type clustered column) based on different possible data mappings. Nevertheless, the data set and the chart selection process may operate so that only one recommendation is presented. FIG. 3 shows three chart subtypes, e.g., the types of column charts that are available. More specifically, the three subtypes shown in FIG. 3 are clustered column 332, stacked column 334, and 100% stacked column 336. While only one clustered column chart 320 under the clustered column chart heading 340 is shown in FIG. 3, there may be multiple charts shown under the clustered column chart heading with different mappings. All of these charts would be of "clustered column chart" subtype 340. Further, there may be one or more charts provided under each of the headings for the stacked column 334, and 100% stacked column 336 subtypes.

Associated with each chart type 320 is a set of recommended layouts and mappings provided by the chart recommendations process for the selected chart type. Data mapping defines what is on the x axis, y axis or series depending on the chart type. When the user selects a chart type 330 from the all charts types 320, e.g., the column chart, the recommended layouts and mappings for the subtypes 332, 334, 336 are displayed on the screen as illustrated for clustered column subtype 332 by the clustered column chart 342 under the clustered column chart heading 340. The user may modify the chart by selecting the button 350, or select the chart by clicking the OK button 360.

The change chart feature may have the same functionality as the insert chart feature. For the change chart scenario and data selection and layout scenario, certain input charts may be linked to external data or contain literal data. The chart recommendation process may be able to provide suggestions when the linked chart is embedded into the workbook of the source worksheet.

Figure 4:
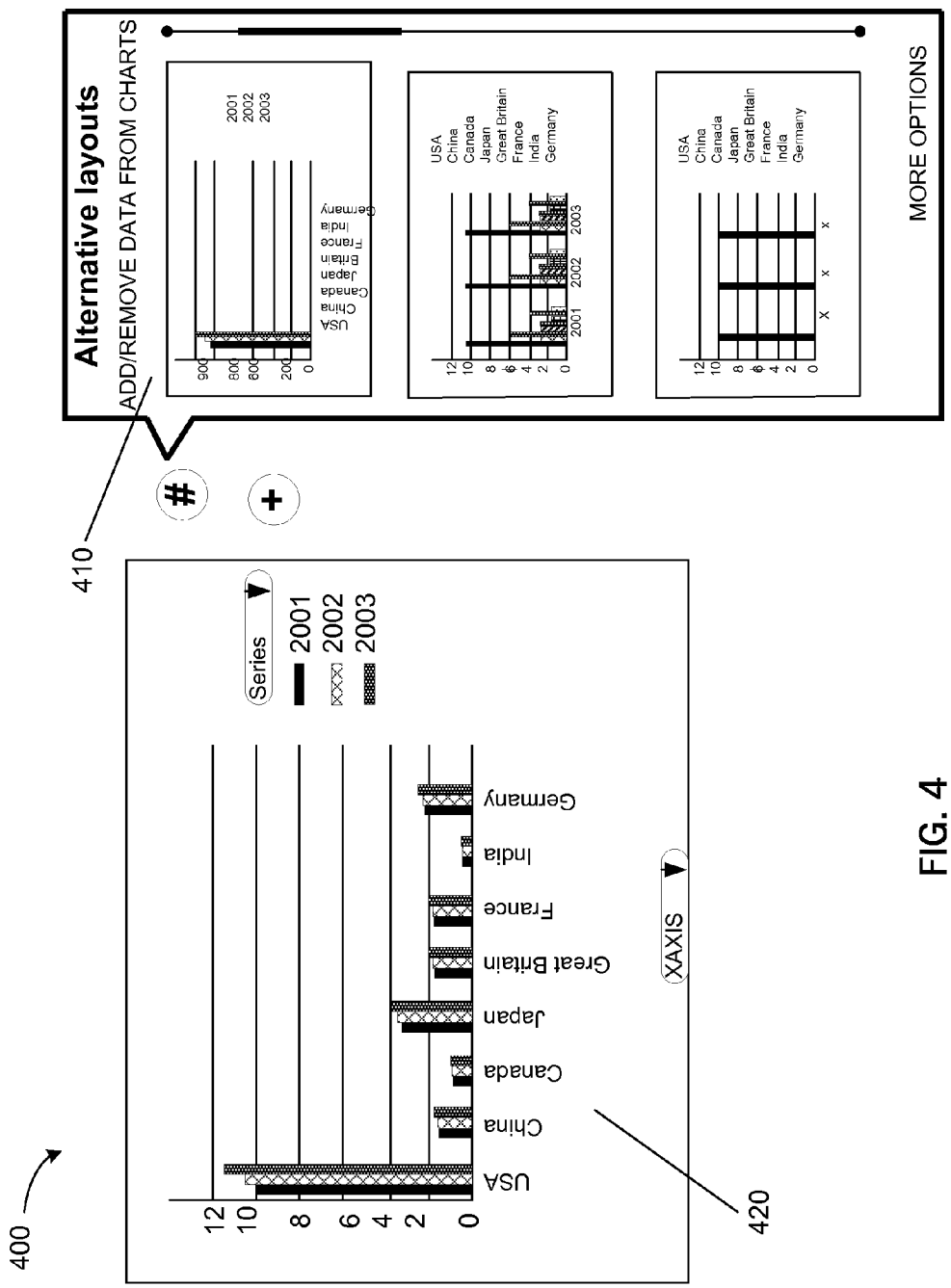
FIG. 4 illustrates the data selection and layout feature according to one embodiment.

FIG. 4 illustrates the data selection and layout feature 400 according to one embodiment. The data selection and layout feature provides a contextual way for users to change the chart data mapping and filter out specific series from the dataset for a given chart in a workbook. The mapping choices in the Layouts Gallery, displayed in the "Alternative Layouts" highlighted box 410, are provided by the chart recommendations process and may be locked to the chart type of the current chart 420.

Figure 5:
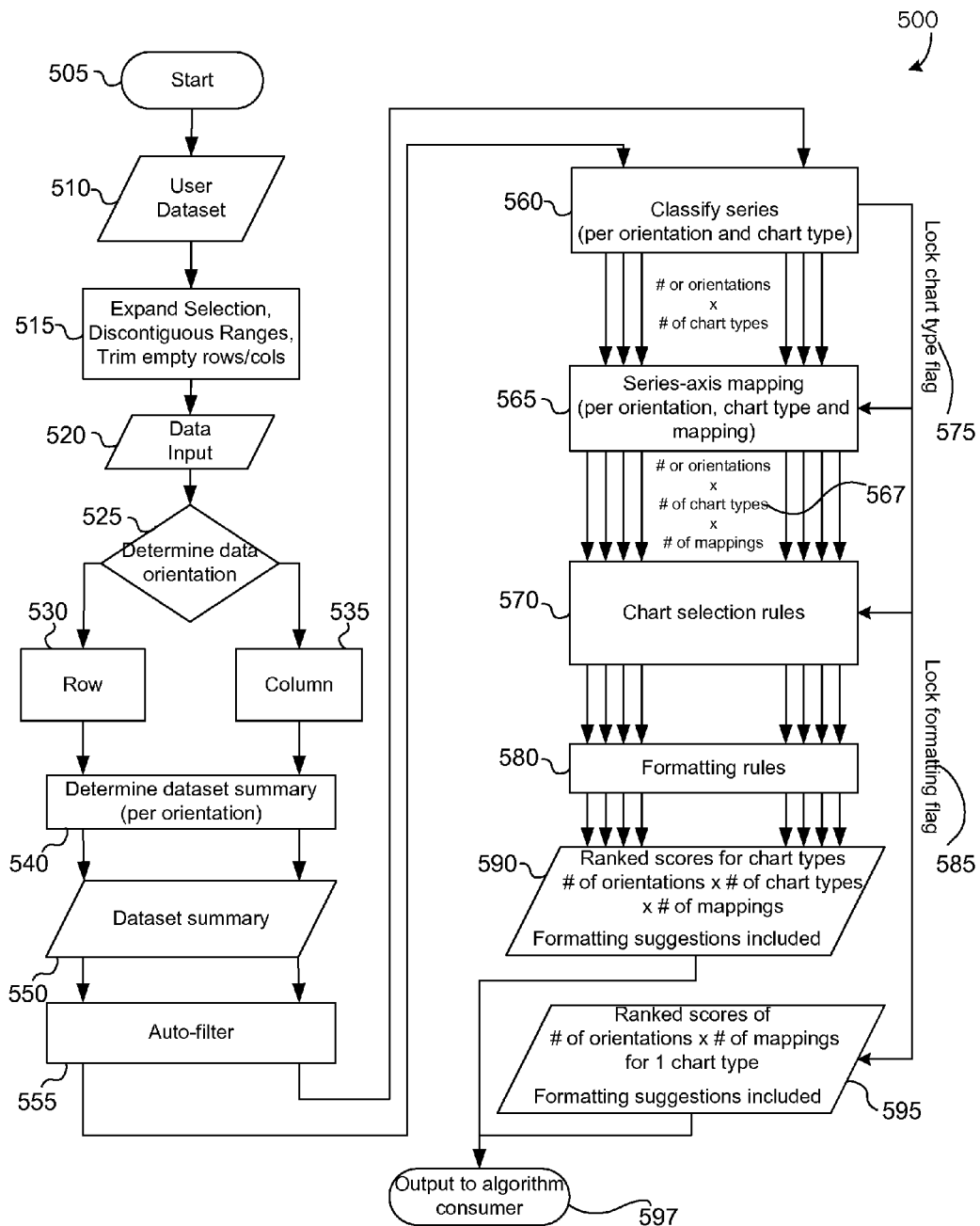
FIG. 5 provides a flowchart of a method for providing chart recommendations according to one embodiment.

FIG. 5 provides a flowchart of the chart recommendations process 500 according to one embodiment. The chart suggestions architecture implements a rule and score based structure for ranking recommendations. The chart recommendation process 500 starts 505 by taking in the user dataset 510. The user dataset 510 may be modified by expanding the selection, addressing discontinuous ranges, and trimming empty rows and columns 515. The resulting data input 520 is fed into the process. The process determines data orientation 525 by heuristically deciding whether the dataset is laid out column-wise 530 or row-wise 535, ranking one orientation higher than the other. By running through both possible layout paths, i.e., column-wise 530 or row-wise 535, the likelihood to correctly recommend a chart with the data laid out in the proper orientation as the user intended is increased. The scores for each path may be weighted with a multiplier according to how likely each orientation reflects the given dataset.

In order to determine per orientation 540 the dataset summary 550, the process may compile together a set of attributes off of which the chart selection rules may be based by examining the dataset. In certain cases with more complex datasets, the process may try to heuristically determine which categories and value series are important to include and which ones are left out. Thus, categories and value series may be filtered out 555. Using the created dataset summaries (one for each orientation), the process analyzes each series in the dataset to determine if it is a categorical series, a value series or a header 560. A categorical series is a series of labels as values, whereas a value series is a series of numerical values. Headers are values that describe the contents of the series. They exist above a series in a column-wise dataset and left of a series in a row-wise dataset. The chart recommendation process 500 may now add mappings to the dataset.

To determine series-axis mapping 565, the categories and value series may be run against a set of predetermined conditions for mapping those series to particular axis on a given chart type. The process has now determined number of orientations, chart types, and mappings 567. For each chart type, the mappings are subjected to a series of chart selection rules 570 that determine how appropriate the mapping is for that particular chart type. Thus, a set of rules are run through for each chart type (see FIG. 16), and each rule corresponds to a static score that gets tallied up at the end. The scores then get normalized across all chart types to provide a consistent basis for comparison.

The chart recommendations process is intended for use by the insert new chart experience, the change chart type experience and the change data layout/mapping experience, each of which have slightly different requirements from the recommendations output. To accommodate this, the process may take in flags that may modify its behavior and recommendations. For example, the lock chart type flag 575 prevents the process from running the chart selection rules over all of the chart types, and limits it to just the chart type provided and the alternate chart types suggestions described in the following section. Because the usage of line charts may be confused with scatter charts, the process may offer suggestions for both types given one or the other as an input, despite the lock chart type flag.

Chart element layout/formatting rules 580 may also be applied by toggling specific chart elements and applying formatting based on certain conditions. Certain conditions in the dataset are better represented in the chart with the formatting or inclusion/exclusion of particular chart elements. For example, it may not make sense to have a legend in the chart when there is only a single value series charted. These rules do not cause additional permutations in the chart suggestion results; they are simply applied to the final chart suggestions. The user may have already customized certain chart elements and formatting. To avoid changing these customizations, the implementer can pass the Lock formatting flag 585 which prevents the process from suggesting chart element layout and formatting options. The only exception may be the chart axis scales, which need to change in relation to the magnitude of the series mapped to it. The recommendations output 590 from the chart recommendations process 500 is a stack ranked list of all the chart suggestions for the given dataset based on their corresponding score. There may be a minimum threshold that the score meets in order for a chart suggestion to be returned. Whether the results apply across all chart types or are specific to one chart type (specified through the Lock Chart Type flag) may be specified 595.

The final chart suggestions are ranked from an internal rules-based scoring system. The scoring system consists of two types of values—static scores and score multipliers. Static scores are mapped against each individual chart selection rule, which determine how appropriate the set of categories and value series for a particular chart type and mapping are. Score multipliers are mapped against the data orientation, series-axis mappings and results filtering rules to provide a broader way to increase or decrease the scores for a group of suggestions. The chart types that may be recommended as output 597 include column (clustered, stacked, or 100% stacked), line (line or 100% stacked), pie (pie, pie of pie, bar or pie), bar (clustered, stacked, of 100% stacked), area (stacked or 100% stacked), scatter, surface, bubble, radar, stock (high-low-close, open high-low-close, volume-high-low-close, volume-open-high-low-close), and combination charts. Those skilled in the art recognize that various modifications or variations may be made to embodiment illustrated with respect to the figures included herein, and the embodiment is not meant to be limited by the particular examples discussed herein. Those skilled in the art will also recognize that more mapping end points may be used, such as category names and series names, e.g., during header detection. Thus, additional or alternative mapping end points may be used. For example, as other potential mapping end points gain widespread adoption as the field of data visualization continues to evolve, such mapping points may be included.

FIGS. 6-9 provide further insight into the selected user dataset 510 and the actual data input 520 fed into the chart recommendation process. In these figures the areas outlined in the broken bold line represent selection of the user dataset 510 and the area outlined in the solid bold line represent the data input 520 fed into the chart recommendations process after editing the selection.

Figure 6:
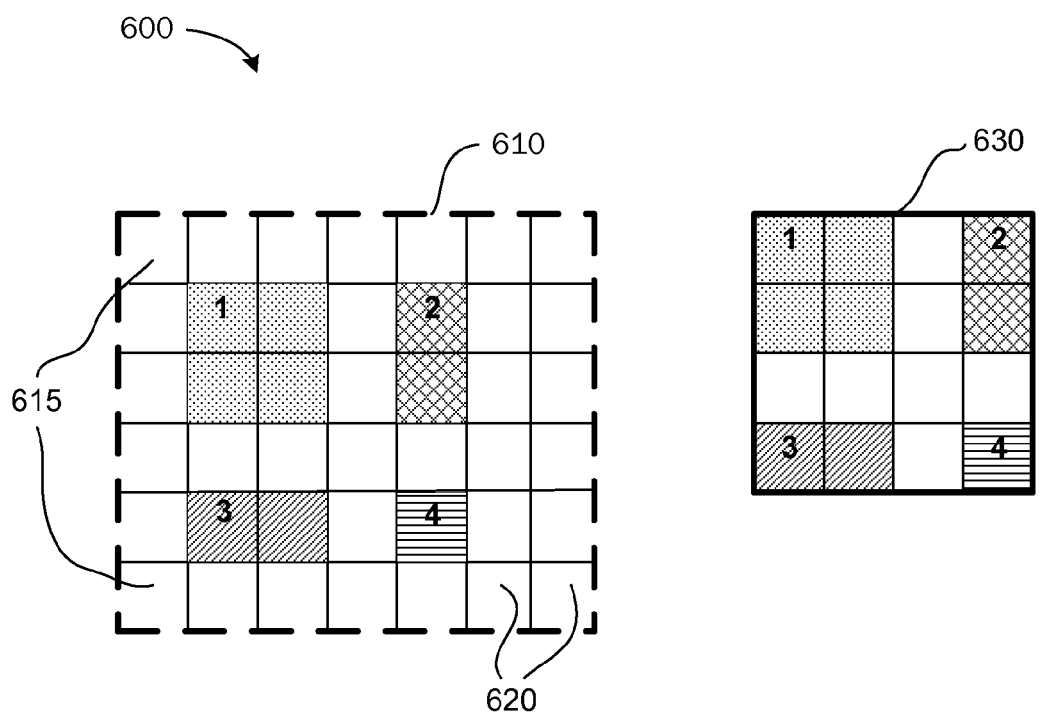
FIG. 6 illustrates trimming empty rows/columns according to one embodiment.

FIG. 6 illustrates trimming empty rows/columns 600 according to one embodiment. The process trims away entirely the empty rows 615 and columns 620 around the user's data selection 610 before passing it on for parsing. The data arrangement 630 with the shaded cells representing data is what the user may see. The trimmed away rows and columns may not impact the cell reference of the range; instead the rows and columns may be marked as filtered out. With regards to the empty interior rows and columns, these are addressed during the series classification process described above with reference to FIG. 5. Any series that is entirely empty may not be considered for the output chart suggestions. Empty data points within any given series are retained.

Figure 7:
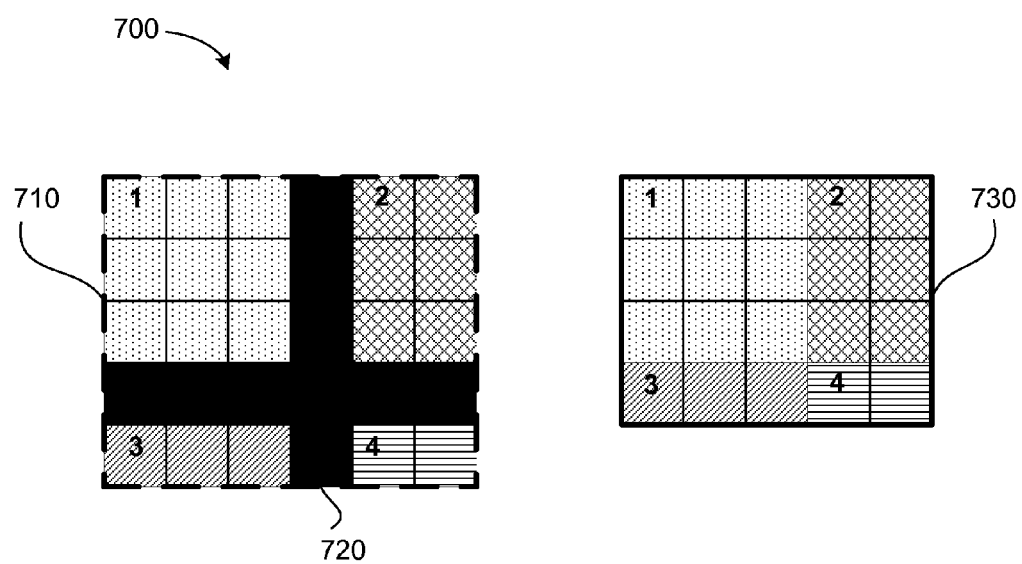
FIG. 7 illustrates the exclusion of filtered series or categories according to one embodiment.

FIG. 7 illustrates the exclusion of filtered series or categories 700 according to one embodiment. To address filtered series and categories, any of the filtered series or categories beyond the series classification stage may be excluded. In FIG. 7 the dataset 710 with the black cells 712 indicating filtered rows and columns 720 represent the before state. The dataset fed actually into the process 730 has the filtered rows and columns excluded.

Figure 8:
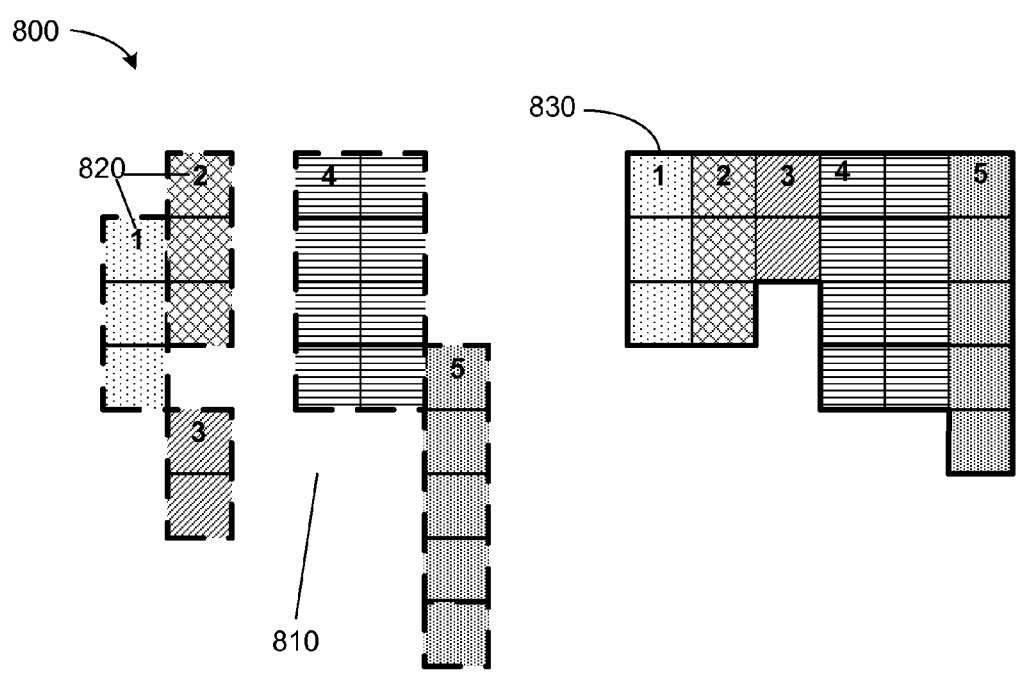
FIG. 8 addresses discontinuous ranges for chart creation according to one embodiment.

FIG. 8 addresses discontinuous ranges for chart creation 800 according to one embodiment. In situations where the user's dataset is composed of multiple discontinuous ranges 810, the ranges may be identified as distinct rectangular regions in a left to right, top to bottom manner indicated by the numbers 820. The multiple discontinuous ranges 810 represented by the rectangular regions may be concatenated together into a rectangular range, with the topmost cell of each range aligned with one another 830 thus providing the data input. Leftover spaces from columns of varying heights are left as blank cells.

Figure 9:
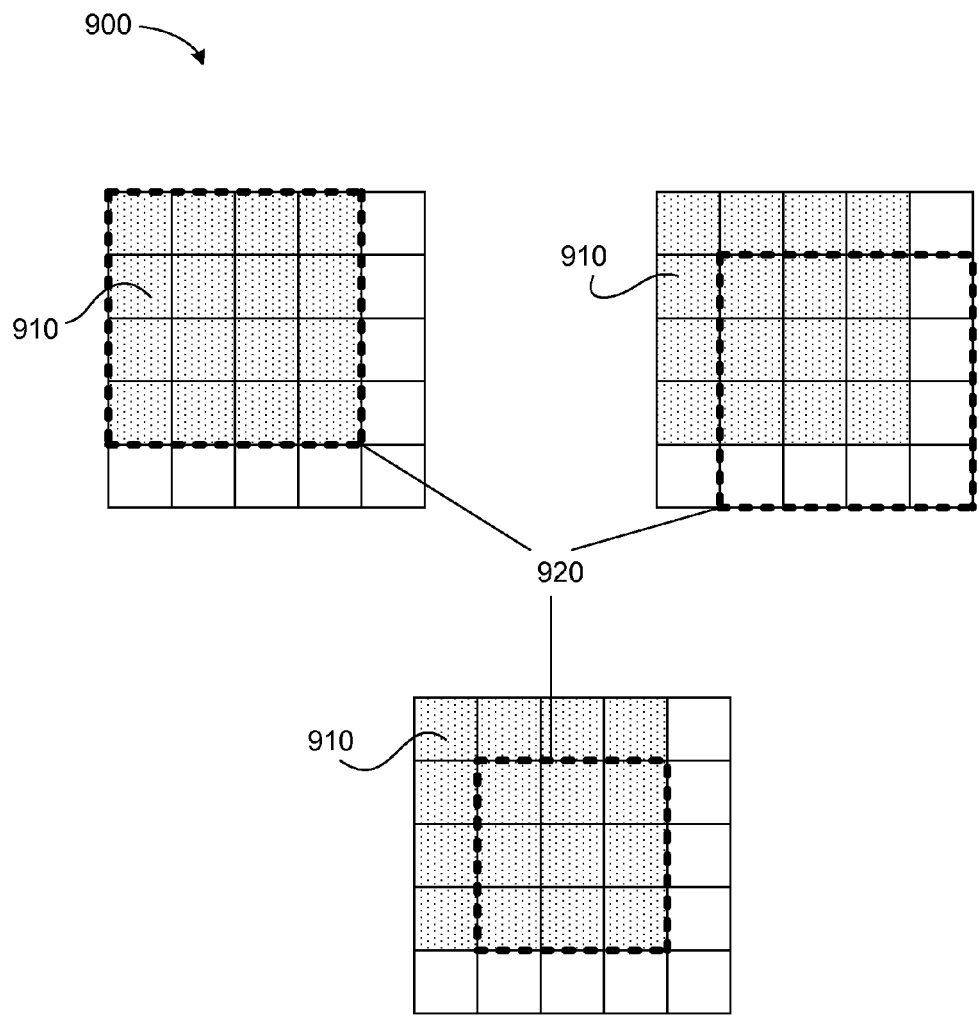
FIG. 9 shows data input ranges that include a portion of a pivot table according to one embodiment.

FIG. 9 shows data input ranges that include a portion of a pivot table 900 according to one embodiment. The shaded regions 910 represent the pivot table on a sheet. The user's input selections 920 framed by the bold broken lines in each case includes a portion of the pivot table 910.

FIG. 10 shows hierarchical categories 1000 according to one embodiment. Hierarchical categories may be identified by a set of categories grouped together on the leftmost side of the range. The shaded series 1010 represent the hierarchy, thus multiple levels of categories in a ranked arrangement. Categories not in this rightmost group 1020 may not be considered part of the hierarchy. Recognizing hierarchical headers is performed in the same manner, looking at headers from the top to bottom of the range.

Figure 11A:
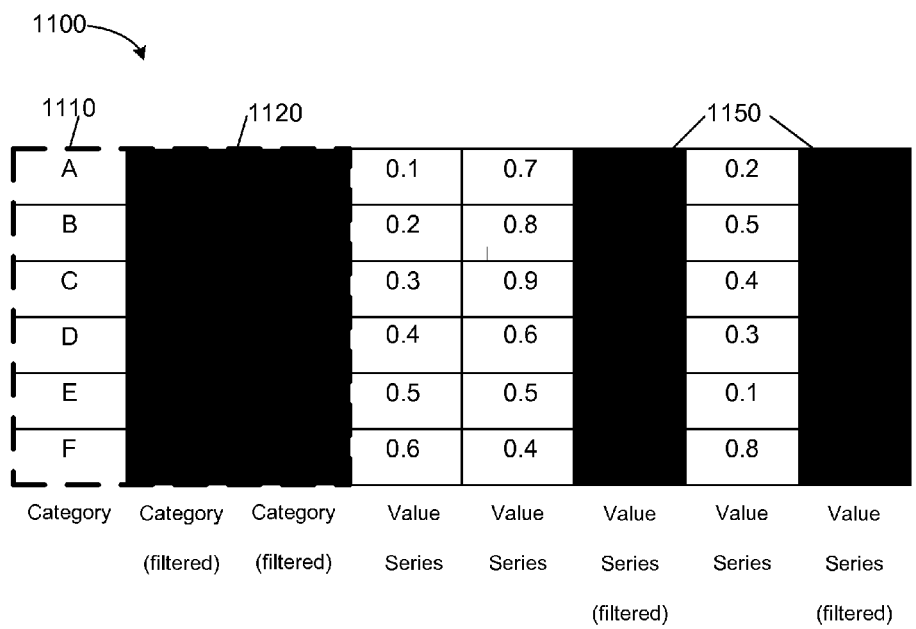
FIGS. 11a-b illustrate the process of picking a single suitable category series when the dataset has multiple categories identified according to one embodiment.
Figure 11B:
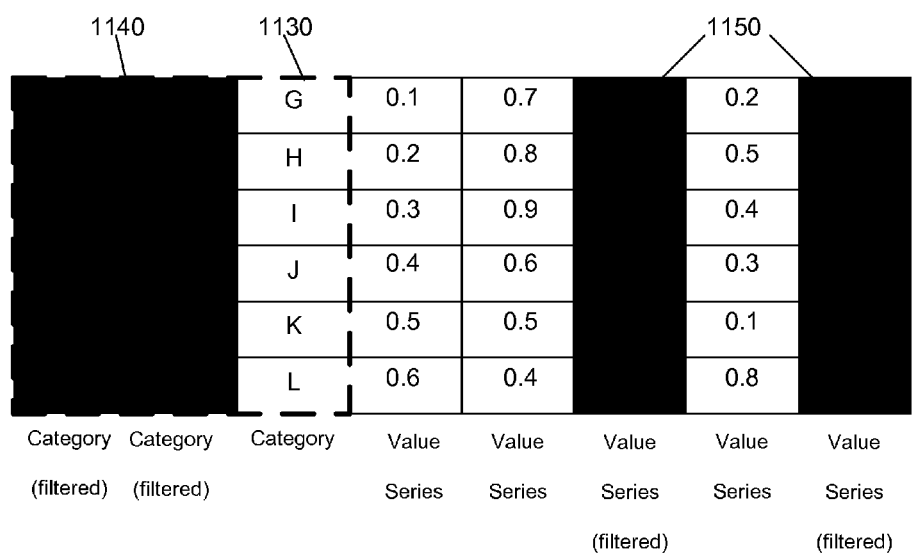

FIGS. 11a-b illustrate the process of picking a single suitable category series when the dataset has multiple categories identified 1100 according to one embodiment. When the input range is auto-expanded from a single cell, the chart recommendations process tries to determine the most useful categories and value series from the input range to include in the chart suggestions. The process involves picking a single suitable category series and a set of suitable value series to pass on. For categories, when there are multiple categories identified, the process may approach the dataset with two possible interpretations. The first is that the multiple categories represent hierarchical categories, the second that the dataset is a table and the different categories identified actually represent associated values.

Referring to FIG. 11a, to distinguish between the two, the process may look at the (# of non-blank values)/(total # of values) ratio of the first category series. If the non-blank/total ratio is above a certain percent, for example 60%, the dataset may be identified as a table and the leftmost category 1110 series is used, with the other categories filtered out 1120 as indicated by black.

Referring to FIG. 11b, if the non-blank/total is less than the pre-determined percent, the dataset is identified as having hierarchical categories, and the rightmost category is used 1130, with the other categories filtered out 1140. For value series, all the value series that fall into the most common numeric group are passed on. All other series may then be filtered out 1150 before the range is passed on to the Series-Axis Mapping process.

FIGS. 12-14 provide examples of datasets run through the chart recommendation process and the charts recommended. In addition, these examples show a chart output that may be displayed when the process is not used, which misrepresents the dataset. The chart recommendation process provides the user with better chart choices. Satisfaction with chart selection may be verified using one or more methods. For example, data points may be implemented to validate whether or not people are using the chart suggestions and whether they are satisfied with the suggestion (refraining from making data layout/mapping changes or change the chart altogether). Another example may include using a Send-a-Smile feature to get glimpses into the datasets users are creating to ensure the process accounts for scenarios that may have originally been missed.

FIGS. 12a-c shows an example of a header on a category series 1200 according to one embodiment. In FIG. 12a, the Year column 1220 in the dataset 1210 is recognized as a year series, while the columns 1230 are composed of non-linear values during the dataset summary process. FIG. 12b shows a chart before the chart recommendation process has run. However, the Year column 1220 gets identified as a category series and the columns 1230 get identified as value series during the series classification process, and are mapped as such during the series-axis mapping stage. FIG. 12c shows that when the mappings are run through the chart selection rules, and since the year column 1220 is a time series, a line chart 1240 may rank higher in this case, while a clustered column chart 1250 may also be offered as a suggestion.

FIGS. 13a-c show an example of composite data with different numeric groups 1300 according to one embodiment. In FIG. 13a, the Dataset Summary process determines that the first column is a month series 1320, and the Income column 1330 and the Profit column 1340 fall into different numeric groups since the Profit column 1340 in the dataset 1310 is composed of percentages. FIG. 13b shows a chart before the chart recommendation process has run. However, the first column, i.e., the month series 1320, gets classified as a category, and the Income column 1330 and the Profit column 1340 classified as value series. During the Series-Axis mapping process, the difference in numeric groups among the value series is noticed. FIG. 13c shows that since the Profits series is composed of percentages, that series gets mapped as a line chart on the secondary axis for the combo chart mapping. The output from the chart selection rules may rank a combo chart 1350 high (since it is an appropriate chart type), followed by a line chart 1360 (since the category is time based).

FIGS. 14a-c show an example of scatter charts 1400 according to one embodiment. In FIG. 14a, the Dataset Summary sees the first column 1420 in the dataset 1410 as all strings and the X column 1430 and Y column 1440 as numeric values. The Y column 1440 is also seen as being a linear series. FIG. 14b shows a chart before the chart recommendation process has run. During the series classification stage, the first column 1420 is classified as a category, the X column 1430 as a value series, and the Y column 1440 as potentially either a category or a value series, although weighted towards a value series because it's not a year series. FIG. 14c shows that, because the first column 1420 is scored higher as a category than the Y column 1440, and because it's the leftmost category in the dataset, it gets chosen as the category series to be mapped. The X column 1430 and the Y column 1440 get mapped as value series. Because of the "X" and "Y" series headers, this is seen as a potential scatter chart mapping. Because it is a suitable scatter chart mapping, the scatter chart suggestion 1450 gets ranked high, followed by a clustered column chart 1460 (due to the discrete strings in the category).

The chart recommendation process uses a set of guidelines to determine optimal charts decisions. There may be guidelines for: analyzing attributes of data; classifying and characterizing data for charts; selecting chart type based on attributes of data and characterization of data; and for formatting charts.

Dataset summary attributes provides examples of attributes of data that may be used to analyze and characterize the data. For example, data attributes may include the numeric series formatted as strings, the average or average length in the series, repetition in the series and the total count or count of distinct values in a series. Other attributes used include is the series the left most or right most one in the range, is the series linear, are the series values numeric, and is the series sorted. In addition data may be characterized by the largest or smallest in a series, or the sum values in a series.

Series classification rules define how categories, value series and header are identified for every chart type supported. From the attributes generated in the dataset summary, scores for each series are generated in the dataset relating to how likely that series is a category versus a value series versus a header. This process is repeated across both a row-wise orientation and a column-wise orientation for all chart types. At least one value series is found for the process to continue; otherwise the process does not return any results.

FIG. 15 provides scoring examples for possible categories and value series attributes for line and area charts 1500 according to one embodiment. For categories 1510, scoring examples include "the column is the left most" 1520 for a score of 1, if "day of week series" 1530 for a score of 3, and "if year series" for a score of 6 to 8 depending on the range 1540. For value series 1550, scoring examples include if the percentage of null values fall between predetermined ranges 1560, if there are no null values 1570 for a score of 6, and if there are null values 1580 for a score of 4.

For most chart types, the process maps the highest ranked category (or hierarchical categories) against all other series, the exceptions being chart types with static mappings. For certain chart types (scatter charts, bubble charts, stock charts), there may exists multiple ways the user may structure the data in their dataset. A notable example of this is with scatter charts, where the value series may be arranged as $[X_1, Y_1, X_2, Y_2]$ or $[X, Y_1, Y_2, Y_3]$ in a given dataset. It becomes difficult to assume the user's intention in this situation simply because (1) the headers may not always be accurate or exist and (2) the value series themselves may all appear to be of the same type (i.e. integers) and magnitude. To address this, the process runs through a static set of potential series-axis mappings, with each mapping having a score multiplier associated with it depending on how common that particular layout is used compared to the others. When the provided dataset contains multiple value series of different numeric groups, a combination chart may be suggested. Combination chart suggestions may be limited to a combination of a clustered column chart on the primary axis and a single line chart on the secondary axis. The line chart may always be on its own secondary axis.

For example, to pick the value series to plot as a line chart, the process may first look through the numeric group types making up the dataset. Amongst the numeric groups, those identified as a Summary numeric group rank highest, followed by Percents, and then the overall second most common numeric group amongst all of the data. Within the chosen numeric group, the highest ranked value series may be plotted as a line chart on its own secondary axis. All other value series within the entire dataset may be plotted on the primary axis as a clustered column chart.

FIG. 16 provides guidelines for chart selection based on attributes and characterization of data 1600 according to one embodiment. The chart recommendation process applies chart selection rules 570 to help determine optimal chart recommendations. The process selects charts based on several criteria that assign a score. The different criteria may include category 1610, legend 1615, values 1620, variables 1625, data density 1630, and uniqueness density 1635. Line, Area, and Surface charts 1640 are all category, legend, and value based, whereas Radar, Clustered Bar, Stacked Bar, and Stacked Column charts 1650 use those three criteria as well as data density based. Stacked bar and column (multiple values), Doughnut, Stacked 100% bar and column, and Pie 1660 are all category, values, and data density based. Bubble and Scatter charts 1645 are based on those three criteria in addition to uniqueness density. The Clustered column 1670 is based on the same criteria as the Stacked Column charts 1650 with the addition of variables. The Stock chart 1680 is category based, but this chart also looks at titles text.

There are two potential scenarios for which a pivot chart would be a better suggestion than a static chart. The first is if the input data range is a pivot table. The second is if the input data range looks like it contains aggregates and would be better suited to be represented by a pivot chart. The pivot chart recommendation, the core process that recommends a pivot structure based on raw data, and the chart recommendation process, the process that recommends the charts, make it easier for users to understand and work with Pivot Charts or Pivot Tables.

Figure 17:
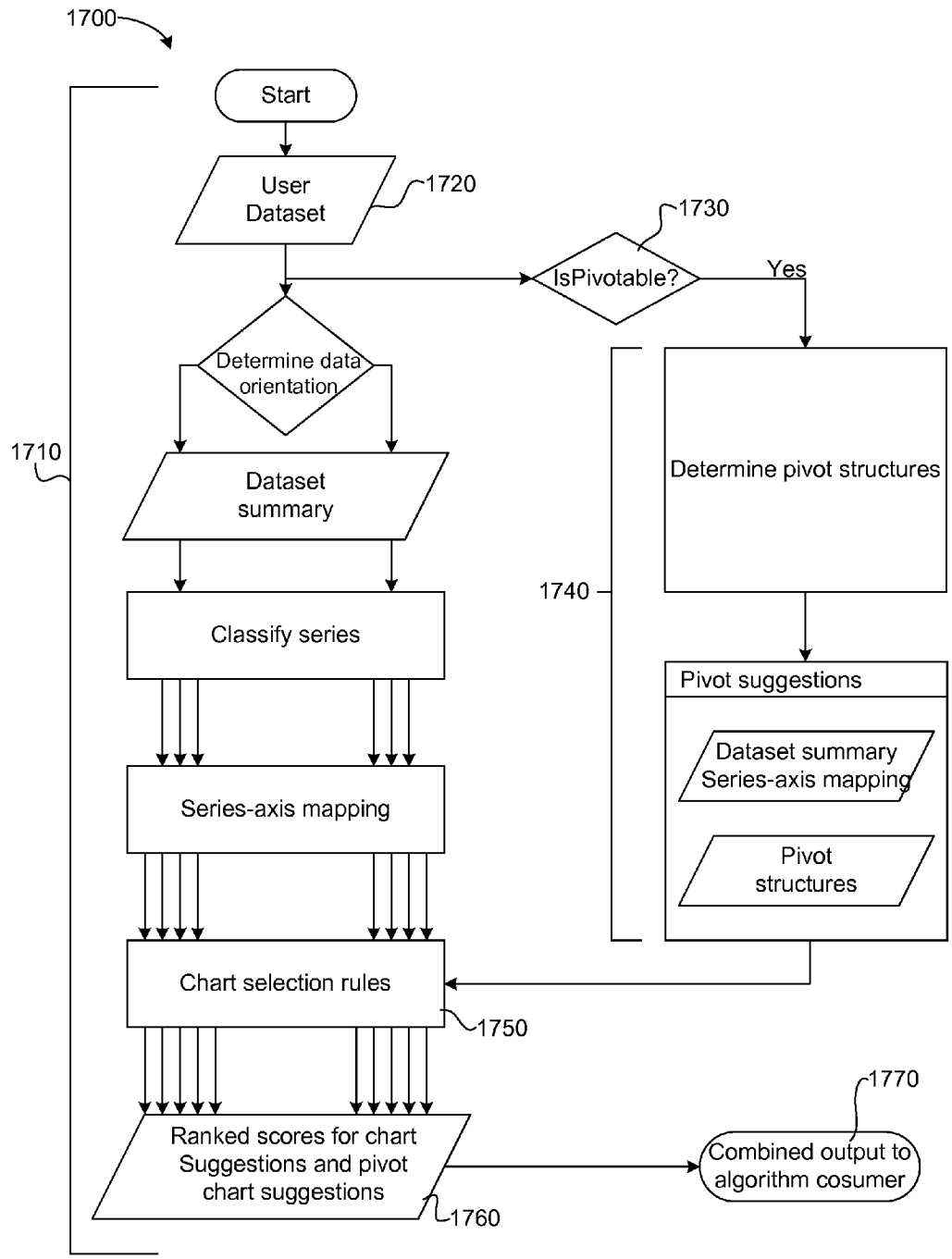
FIG. 17 is a high order process flowchart illustrating the integration of a pivot structure recommendation and a chart recommendation according to one embodiment.

FIG. 17 is a high order process flowchart illustrating the integration of the PIVOT CHART RECOMMENDATION and the chart recommendation process 1700 according to one embodiment. The chart recommendation process 1710 may rely on the rules and heuristics of the Pivot feature for detecting when a pivot chart is appropriate to recommend and how the pivot structure gets generated from the given dataset. If the input data range contains aggregates and would be better represented by a pivot chart, the following process may be used. After receiving and processing the input dataset 1720, the chart recommendation process 1710 calls the pivot chart recommendation process 1730 to determine whether or not the input dataset 1720 is appropriate for creating a pivot chart. If determined to be suitable, the dataset is passed off to the pivot chart recommendation process 1740 to generate the suggested pivot structures, while at the same time the chart recommendation process 1710 proceeds as usual. Upon entering the Chart Selection Rules process 1750, the pivot chart recommendation process 1740 provides a set of pivot chart suggestions, as well as an associated dataset summary and series-axis mapping for each suggestion, to run through the Chart Selection Rules process 1750. The resulting pivot chart suggestions are merged into the static chart suggestions based on scores 1760, and output to the consumer 1770. If the input dataset 1720 is determined to be a pivot table, as described in the first scenario above, the process may be the same except the chart recommendation process may not create its own set of chart suggestions, instead relying entirely on the pivot chart recommendation process 1740 to provide the pivot chart suggestions.

FIG. 18 shows PivotTable suggestions for a dataset that contains aggregates 1800 according to one embodiment. The pivot chart recommendation process may provide the best summarization of data that are of higher value to the user when user has repetitive data sets 1810. This can prevent users from having to manually re-arrange their data or having to create pivot tables. The suggestions provided by the pivot chart recommendation process include pivot table suggestions by customer 1820, fruit 1830, and by farm 1840. The user may select a table suggestion, for example by customer 1820, which is displayed on the screen 1850.

Figure 19:
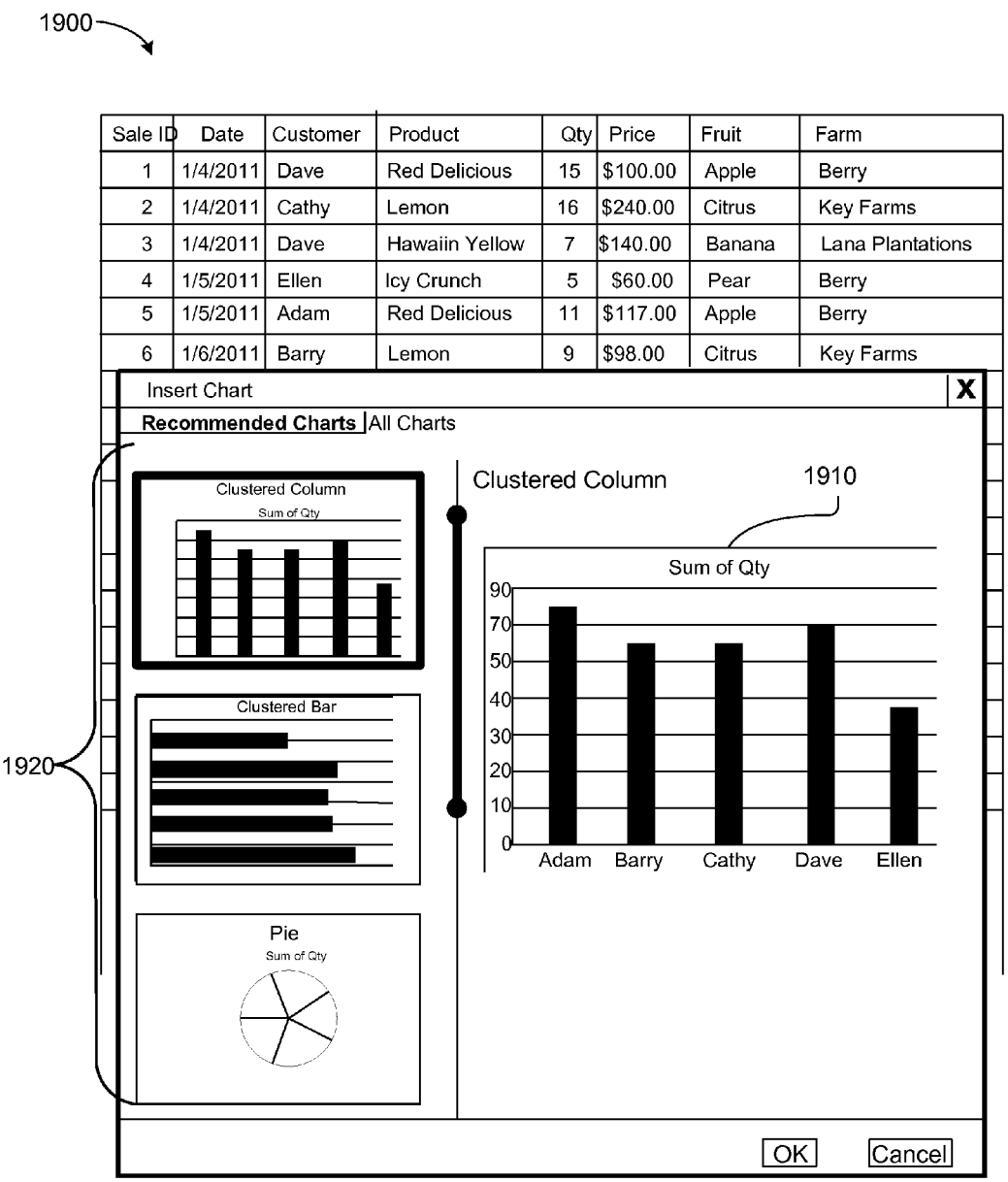
FIG. 19 shows recommended charts for the pivot table suggestion selected above according to one embodiment.

FIG. 19 shows recommended charts for the pivot table suggestion selected above 1900 according to one embodiment. The user selected the clustered column chart 1910 from the selection list 1920. Without the integration of the pivot chart recommendation process, the chart recommendation process may not have made any recommendations since the chart recommendation process does not summarize data. Using summarized data provided from the pivot chart recommendation process, users may get meaningful visualizations, e.g. clustered column chart 1910, for repetitive datasets.

Figure 20:
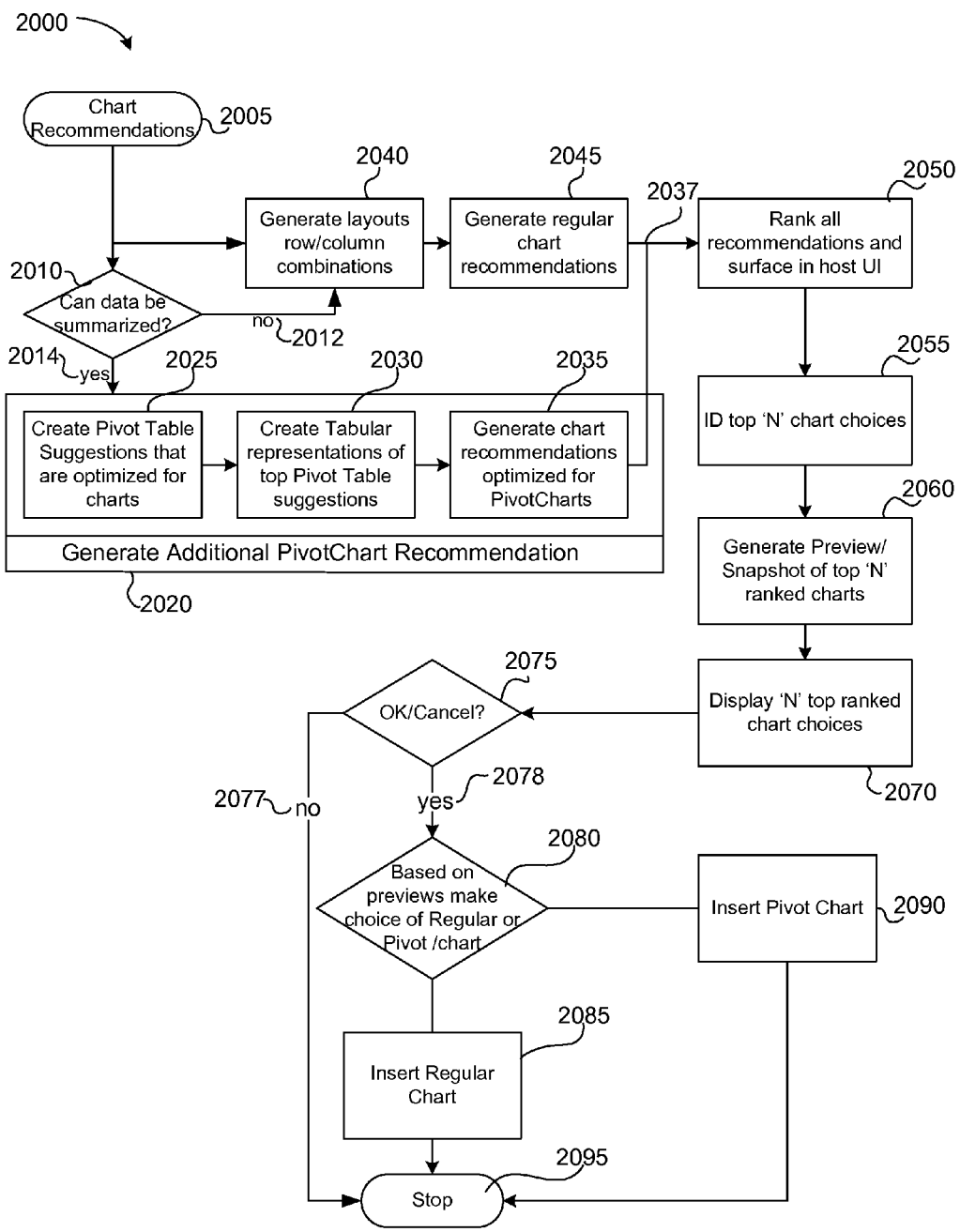
FIG. 20 provides a detailed flowchart of the chart recommendations with the additional pivot chart recommendations according to one embodiment.

FIG. 20 provides a detailed flowchart of the chart recommendation process with the additional pivot chart recommendations 2000 according to one embodiment. When a user wants chart recommendations on data 2005, the chart recommendation process calls the pivot chart recommendation process 2020 by asking if data can be summarized 2010. Regardless of this, the chart recommendation process may still generate regular chart recommendations 2040 and 2045. If dataset cannot be summarized 2012, no pivot table summarizations are generated. If the dataset may be summarized 2014, pivot table suggestions that are optimized for pivot charts may be created 2025. An example of optimization may be skipping PivotTable shape tests because the shape of the table is hidden and does not matter. Since the chart recommendation process expects tabular data, the pivot chart recommendation process creates tabular representations of the top pivot table suggestions 2030. Then the pivot chart recommendation process generates chart recommendations based off these tabular datasets optimized for pivot charts 2035. Only the original user selection is used by pivot chart recommendation process to determine which fields (or columns) to recommend as value candidates, row candidates, and column candidates for the value axis, row axis, and column axis when generating a pivot table recommendation. When pivot table data is provided to the chart recommendation process 2037, the nature of the series/category combinations for the dataset has been decided. Hence, the chart recommendation process may consume this data as-is and not try to determine additional orientations of the data. The chart recommendation process does not use the components of data input, data orientation, header detection, classify series, auto-filter series, and series-axis mapping since the pivot chart recommendation process already provides this information. However, the chart recommendation process may perform all the analysis and scoring for the pivot table data. This may help maintain parity between the summarized and non-summarized data. The data summary, chart selection rules, chart element layout/formatting rules and recommendations output may all be used by the chart recommendation process. The chart recommendation process may rank all pivot chart recommendations along with regular chart recommendations 2050. The top N, a predetermined number, chart choices are identified 2055 and the chart recommendation process generates preview/snapshots 2060 and displays 2070 these top N ranked choices. The user may decide whether or not to insert a chart from the recommendations 2075. If the user decides to cancel 2077, the chart recommendation process is terminated 2095. If the user decides to insert chart 2078, based on previews the user may have the choice of a regular or pivot chart 2080. If the user chooses pivot, a pivot chart is displayed 2090, else a regular chart is displayed 2085. The following pivot charts 2090 may be recommended: column (clustered, stacked, or 100% stacked); line (line or 100% stacked); pie (pie, pie of pie, bar or pie), bar (clustered, stacked, of 100% stacked); area (stacked or 100% stacked); bubble, radar, doughnut. Other chart types such as scatter, stock, and surface charts may not be recommended because such charts may not be applicable to pivot charts.

Figure 21:
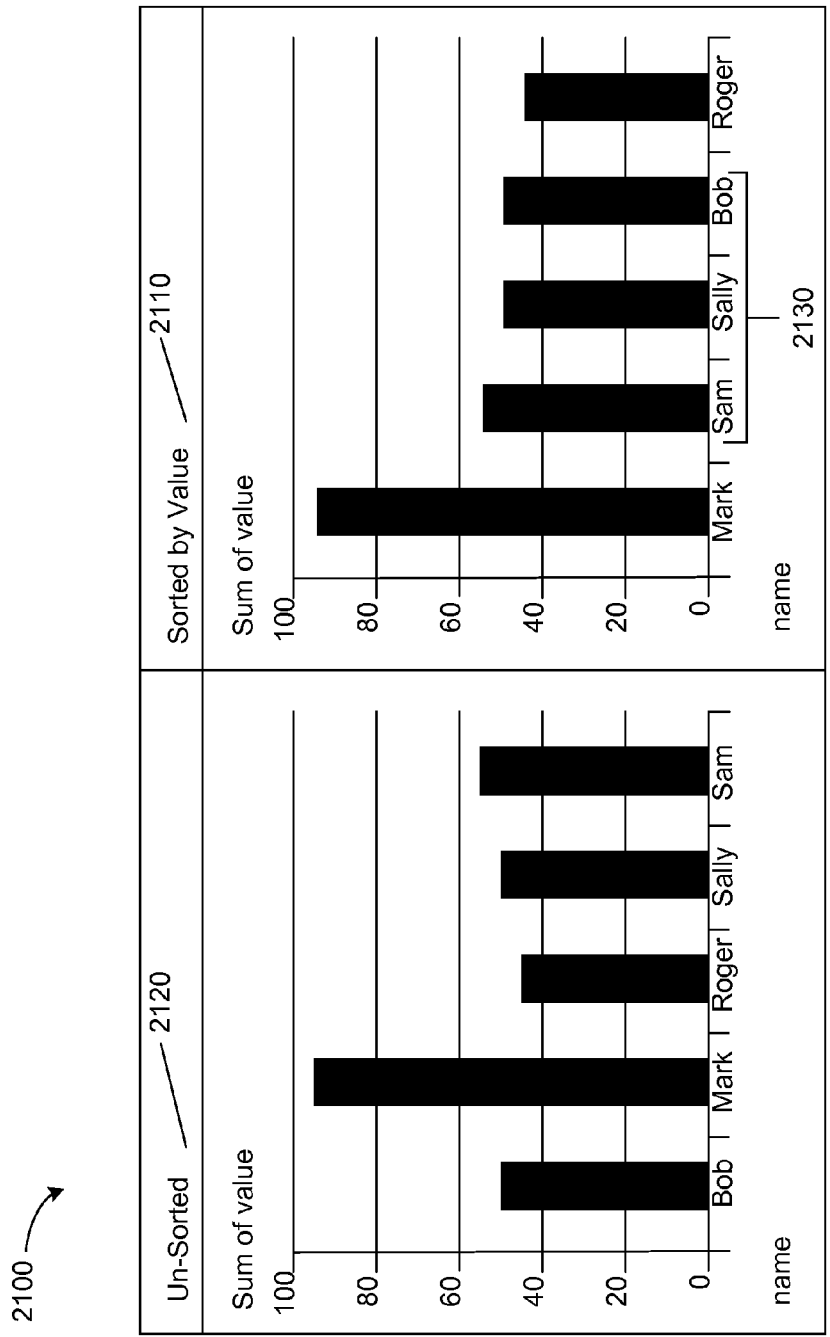
FIG. 21 illustrates sorting a category axis by values according to one embodiment.

FIG. 21 illustrates sorting a category axis by values 2100 according to one embodiment. Sorting category axis by values adds a lot of extra value to the chart and makes the chart look professional. The recommended summary table 2110 is sorted by values (largest to smallest) only when the following is true: there is exactly one field on ROW and exactly one field on VALUE axis; there are no COLUMN fields being used; the data type of ROW field is determined to be of text type. In FIG. 21, it is very easy to compare Bob, Sally, and Sam 2130 in the sorted chart 2110 as compared to the unsorted chart 2120.

Figure 22:
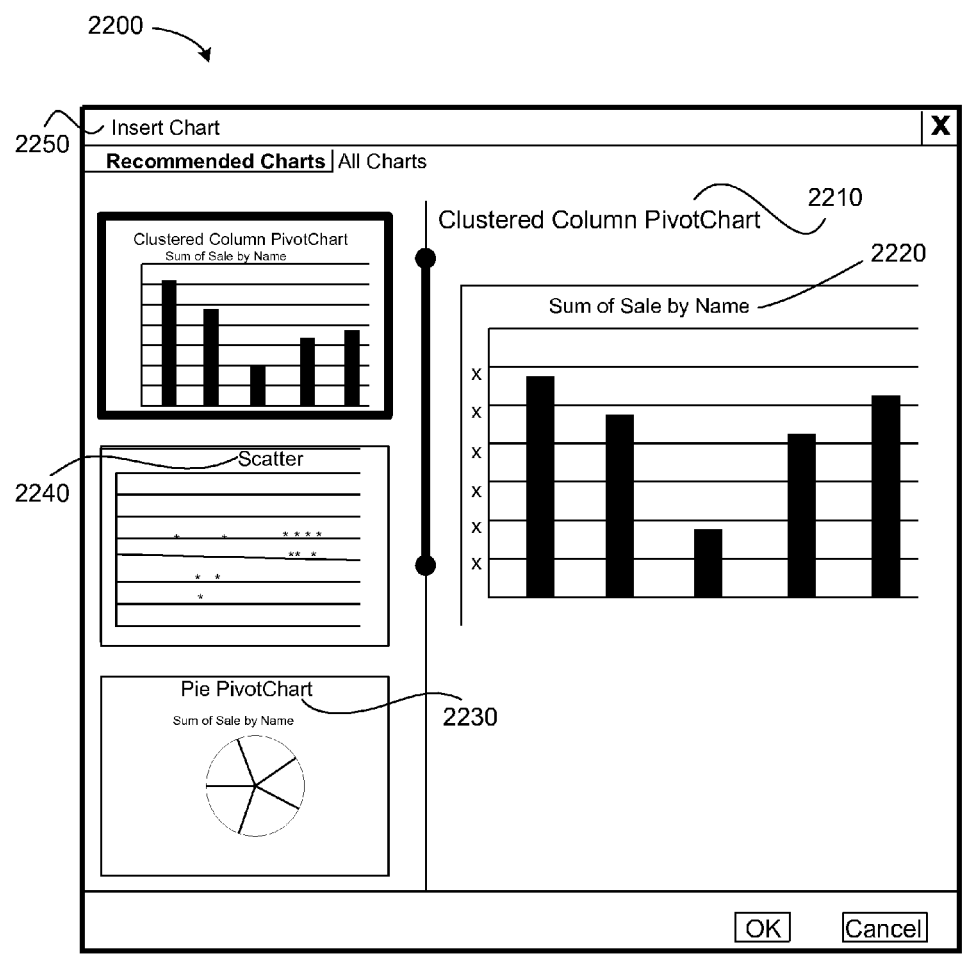
FIG. 22 shows the naming of the recommendation title and chart title for pivot tables according to one embodiment.

FIG. 22 shows the naming of the recommendation title and chart title for pivot tables 2200 according to one embodiment. In the chart creation gallery, each chart has a title that describes the chart type, for example Line Chart. In order to clearly indicate to the user that the recommended suggestion is a pivot chart, the phrase "Chart" may be replaced with "PivotChart" 2210. The pivot chart recommendation process may create a description for each recommended pivot table. This description may be seen as the title of the generated chart 2220.

Pivot charts 2230 and regular charts 2240 may be stacked ranked together and displayed in the order of their stack ranked scores when recommending charts 2250 in the "Insert chart" dialog. The Pivot chart recommendations may not be shown in the "Change chart" type dialog (unless the chart itself is a pivot chart in which case only pivot charts may be shown) or in the "alternate layout" gallery on regular charts. The "Insert chart" dialog may host a predetermined number of chart suggestions. If there are regular chart suggestions available, a predetermined percentage of the spots may be reserved for regular charts regardless of how they stack up in the ranking as compared to the pivot chart suggestions.

Figure 23A:
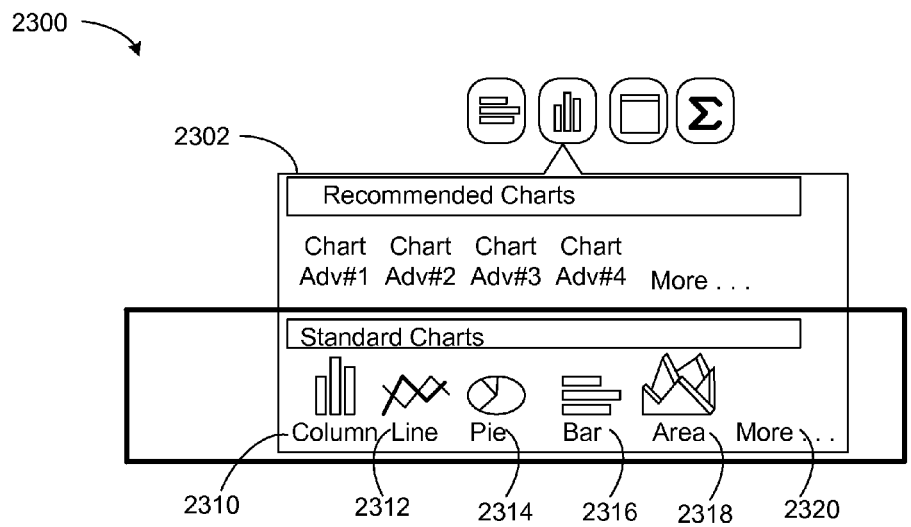
FIGS. 23a-b illustrate recommendations presented in a window according to embodiments.
Figure 23B:
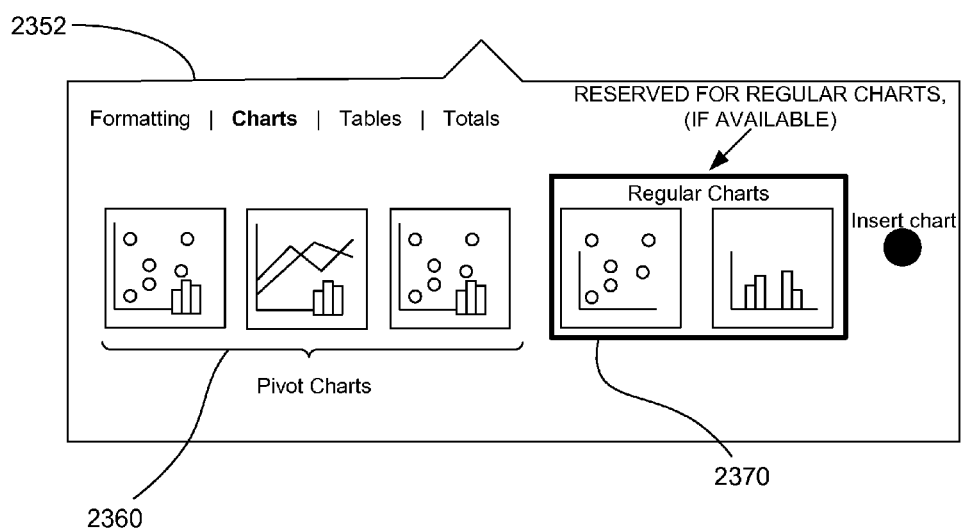

FIGS. 23a-b illustrate recommendations presented as data mapping alternatives in a window 2300 according to embodiments. The Analysis Lens 2302, 2352 shown in FIGS. 23a-b show the user a few data mapping alternatives and allows the user to launch the full dialog experience from there. In FIG. 23a, an Analysis Lens 2302 for standard charts is shown. A column chart 2310, a line chart 2312, a pie chart 2314, a bar chart 2316 and an area chart 2318 are recommended. A selection for requesting more recommendations 2320 is also provided.

FIG. 23b shows an Analysis Lens 2352 for recommending pivot charts. The Analysis Lens 2352 may use the same list of chart suggestions as the Insert Chart recommendation pane. However, the suggestions do not have to be the same between the entrances of both features, especially if automapping plays a role in Insert Chart, but not in the Analysis Lens 2352 where the filtering user interface may not always be visible and hence confusing to the user in the Analysis Lens 2352 for single-cell selection scenarios. For example, if there are regular chart suggestions available, a percentage of the spots (e.g. 40%) may be reserved for regular charts 2370 regardless of how they stack up in the ranking as compared to the pivot chart suggestions. In FIG. 23, the top suggestions are pivot charts 2360, but there are also regular charts available 2370 available for selection.

Figure 24:
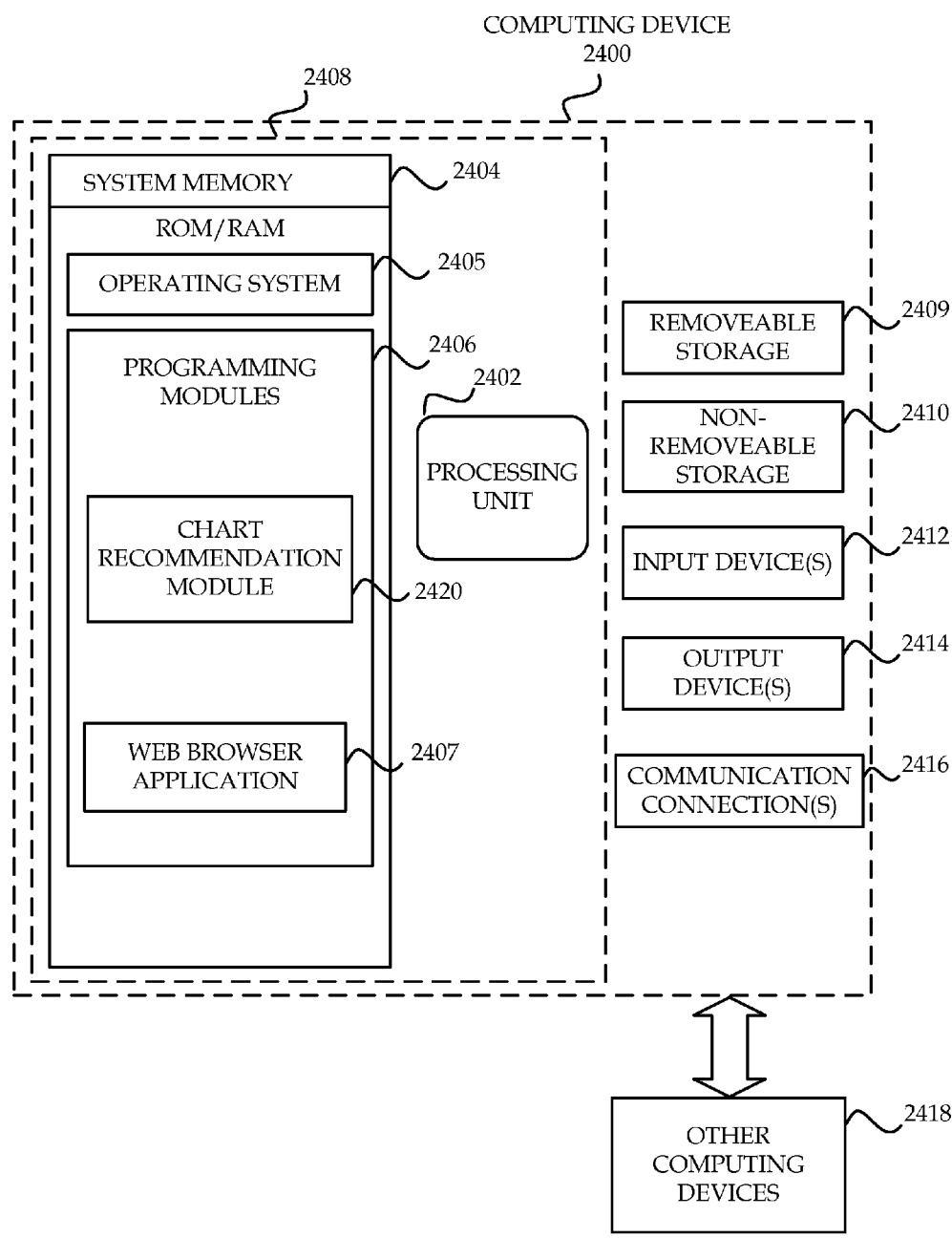
FIG. 24 is a simplified block diagram of a computing device with which embodiments of the present invention may be practiced.

FIG. 24 is a block diagram illustrating example physical components of a computing device 2400 with which embodiments may be practiced. In a basic configuration, computing device 2400 may include at least one processing unit 2402 and a system memory 2404. Depending on the configuration and type of computing device, system memory 2404 may comprise, but is not limited to, volatile (e.g. random access memory (RAM)), non-volatile (e.g. read-only memory (ROM)), flash memory, or any combination. System memory 2404 may include operating system 2405, one or more programming modules 2406, and may include the chart recommendation module 2420 for providing chart recommendations. Operating system 2405, for example, may be suitable for controlling the operation of computing device 2400. Furthermore, embodiments may be practiced in conjunction with a graphics library, other operating systems, or any other application program and is not limited to any particular application or system. This basic configuration is illustrated in FIG. 24 by those components within a dashed line 2408.

Computing device 2400 may have additional features or functionality. For example, computing device 2400 may also include additional data storage devices (removable and/or non-removable) such as, for example, magnetic disks, optical disks, or tape. Such additional storage is illustrated in FIG. 24 by a removable storage 2409 and a non-removable storage 2410.

As stated above, a number of program modules and data files may be stored in system memory 2404, including operating system 2405. While executing on the at least one processing unit 2402, programming modules 2406, such as the chart recommendation module 2420, may perform processes including, for example, one or more of the processes described above with reference to FIGS. 1-23. The aforementioned processes are an example, and at least one processing unit 2402 may perform other processes. Other programming modules that may be used in accordance with embodiments may include electronic mail and contacts applications, word processing applications, spreadsheet applications, database applications, slide presentation applications, drawing or computer-aided application programs, etc.

Generally, consistent with embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments may be practiced via a system-on-a-chip (SOC) where each or many of the components illustrated in FIG. 24 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the chart recommendation module 2420 may be operated via application-specific logic integrated with other components of the computing device 2400 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, may be implemented as a computer process (method), a computing system, or as an article of manufacture, such as a computer program product or computer-readable storage medium. The computer program product may be a computer-readable storage medium readable by a computer system and encoding a computer program of instructions for executing a computer process.

The term computer-readable storage medium as used herein may include computer storage media. Computer storage media may include volatile and nonvolatile, removable and non-removable media implemented in any method or technology for storage of information, such as computer-readable instructions, data structures, program modules, or other data. System memory 2404, removable storage 2409, and non-removable storage 2410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2400. Any such computer storage media may be part of computing device 2400. Computing device 2400 may also have input device(s) 2412 such as a keyboard, a mouse, a pen, a sound input device, a touch input device, etc. Output device(s) 2414 such as a display, speakers, a printer, etc. may also be included. The aforementioned devices are examples and others may be used.

Communication media may be embodied by computer-readable instructions, data structures, or other data in a modulated data signal, such as a carrier wave or other transport mechanism, and includes any information delivery media. The term modulated data signal may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 25A:
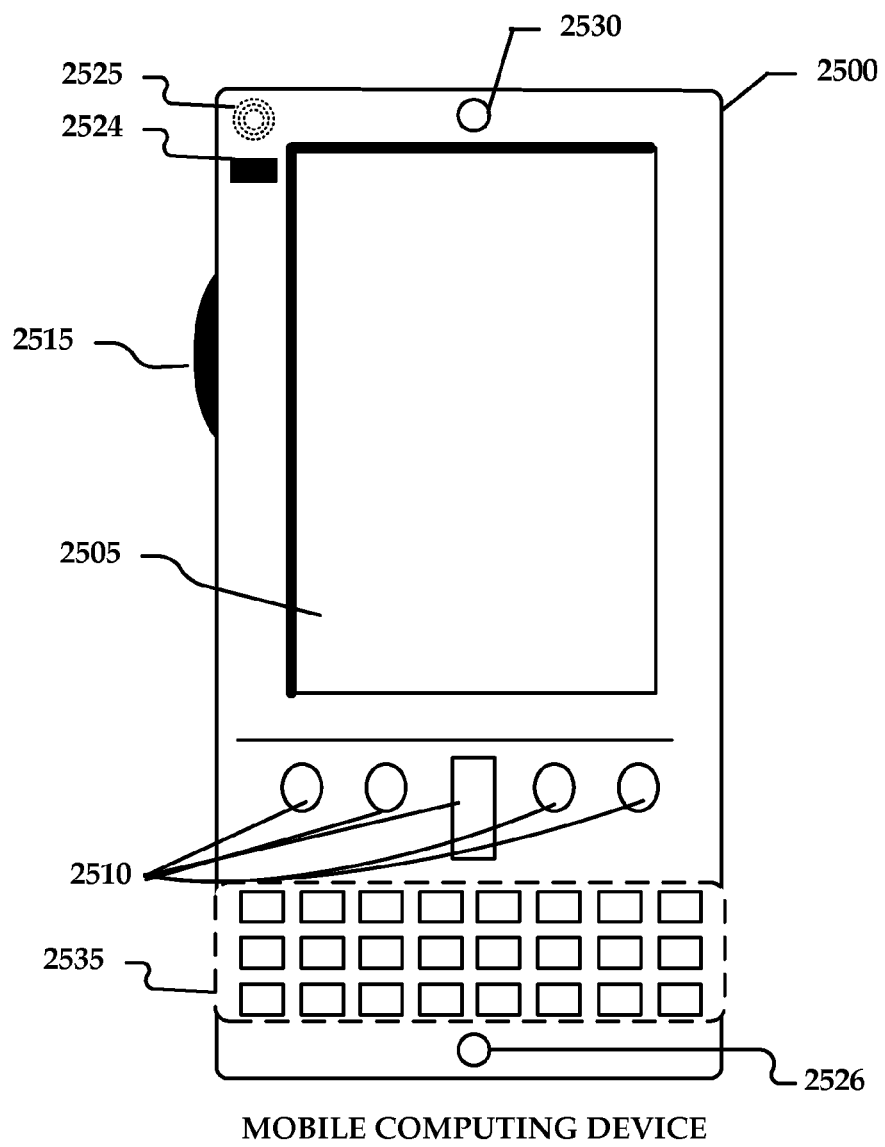
FIGS. 25a-b are simplified block diagrams of a mobile computing device with which embodiments of the present invention may be practiced.
Figure 25B:
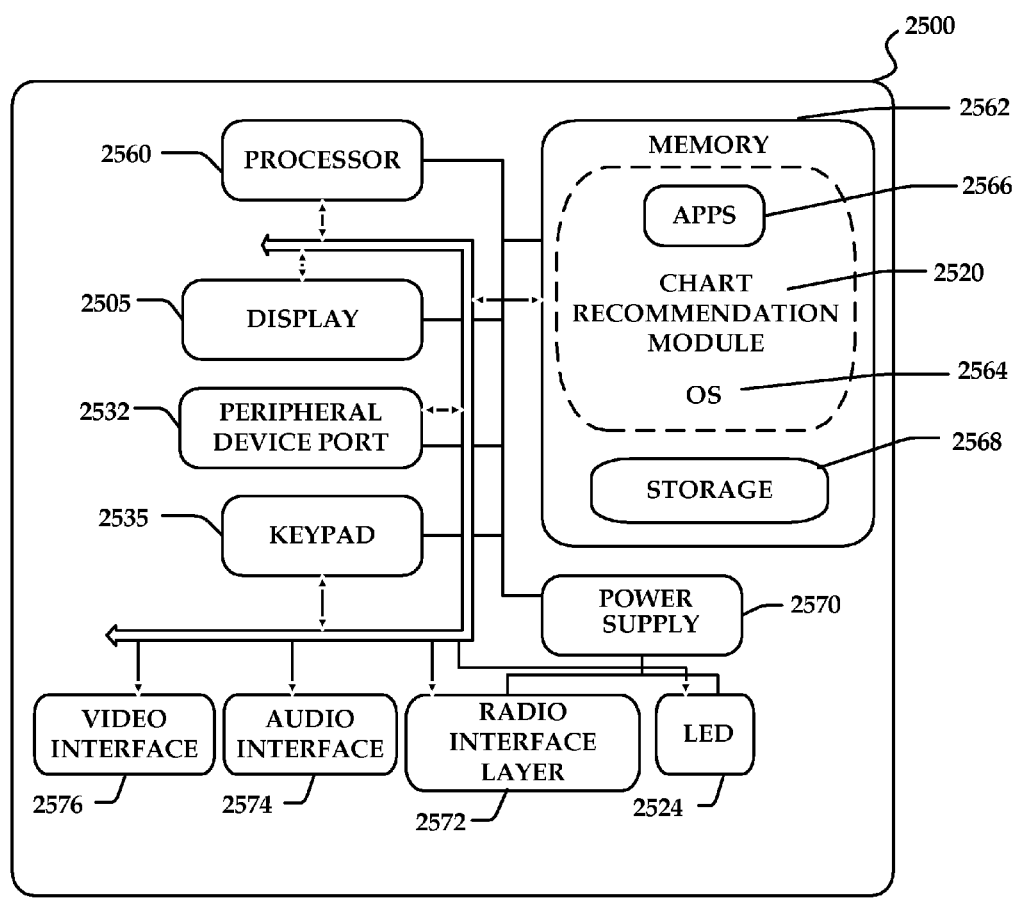

FIGS. 25*a-b* illustrate a suitable mobile computing environment, for example, a mobile computing device 2500, a smart phone, a tablet personal computer, a laptop computer, and the like, with which embodiments may be practiced. With reference to FIG. 25a, an example mobile computing device 2500 for implementing the embodiments is illustrated. In a basic configuration, mobile computing device 2500 is a handheld computer having both input elements and output elements. Input elements may include touch screen display 2505 and optional side input button 2515 that allow the user to enter information into mobile computing device 2500. Mobile computing device 2500 may also incorporate an optional side input button 2515 allowing further user input. Optional side input button 2515 may be a rotary switch, a button, or any other type of manual input element. In alternative embodiments, mobile computing device 2500 may incorporate more or less input elements. For example, touch screen display 2505 may not be a touch screen in some embodiments. In yet another alternative embodiment, the mobile computing device is a portable phone system, such as a cellular phone having touch screen display 2505 and optional side input button 2515. Mobile computing device 2500 may also include an optional keypad 2535. Optional keypad 2535 may be a physical keypad or a "soft" keypad generated on the touch screen display.

Mobile computing device 2500 incorporates output elements, such as touch screen display 2505, which can display a graphical user interface (GUI). Other output elements include speaker 2525 and LED light 2524. Additionally, mobile computing device 2500 may incorporate a vibration module (not shown), which causes mobile computing device 2500 to vibrate to notify the user of an event. In yet another embodiment, mobile computing device 2500 may incorporate a headphone jack (not shown) for providing another means of providing output signals.

Although described herein in combination with mobile computing device 2500, alternative embodiments may be used in combination with any number of computer systems, such as in desktop environments, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments.

FIG. 25b is a block diagram illustrating components of a mobile computing device used in one embodiment, such as the computing device shown in FIG. 25a. That is, mobile computing device 2500 can incorporate system 2502 to implement some embodiments. For example, system 2502 can be used in implementing a "smart phone" that can run one or more applications similar to those of a desktop or notebook computer such as, for example, browser, e-mail, scheduling, instant messaging, and media player applications. In some embodiments, system 2502 is integrated as a computing device, such as an integrated personal digital assistant (PDA) and wireless phone.

One or more application programs 2566 may be loaded into memory 2562 and run on or in association with operating system 2564. Examples of application programs include phone dialer programs, e-mail programs, PIM (personal information management) programs, word processing programs, spreadsheet programs, Internet browser programs, messaging programs, and so forth. System 2502 also includes non-volatile storage 2568 within memory 2562. Non-volatile storage 2568 may be used to store persistent information that is lost if system 2502 is powered down. Application programs 2566 may use and store information in non-volatile storage 2568, such as e-mail or other messages used by an e-mail application, and the like. A synchronization application (not shown) also resides on system 2502 and is programmed to interact with a corresponding synchronization application resident on a host computer to keep the information stored in non-volatile storage 2568 synchronized with corresponding information stored at the host computer. Other applications may be loaded into memory 2562 and run on the mobile computing device 2500, including the chart recommendation module 2520, described herein.

System 2502 has a power supply 2570, which may be implemented as one or more batteries. Power supply 2570 might further include an external power source, such as an AC adapter or a powered docking cradle that supplements or recharges the batteries.

System 2502 may also include a radio 2572 that performs the function of transmitting and receiving radio frequency communications. Radio 2572 facilitates wireless connectivity between system 2502 and the "outside world", via a communications carrier or service provider. Transmissions to and from radio 2572 are conducted under control of the operating system 2564. In other words, communications received by radio 2572 may be disseminated to application programs 2566 via the operating system 2564, and vice versa.

Radio 2572 allows system 2502 to communicate with other computing devices, such as over a network. Radio 2572 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

This embodiment of system 2502 is shown with two types of notification output devices; LED light 2524 that can be used to provide visual notifications and an audio interface 2574 that can be used with speaker 2525 to provide audio notifications. These devices may be directly coupled to power supply 2570 so that when activated, they remain on for a duration dictated by the notification mechanism even though processor 2560 and other components might shut down for conserving battery power. LED light 2524 may be programmed to remain on indefinitely until the user takes action to indicate the powered-on status of the device. Audio interface 2574 is used to provide audible signals to and receive audible signals from the user. For example, in addition to being coupled to speaker 2525, audio interface 2574 may also be coupled to a microphone to receive audible input, such as to facilitate a telephone conversation. In accordance with embodiments, the microphone 2526 may also serve as an audio sensor to facilitate control of notifications, as described below. System 2502 may further include video interface 2576 that enables an operation of on-board camera 2530 to record still images, video stream, and the like.

A system 2502 for implementing a mobile computing system may have additional features or functionality. For example, the device may also include additional data storage devices (removable and/or non-removable) such as, magnetic disks, optical disks, or tape. Such additional storage is illustrated in FIG. 25b by non-volatile storage 2568. Computer-readable storage media may include volatile and nonvolatile, removable and non-removable media implemented in any method or technology for storage of information, such as computer-readable instructions, data structures, program modules, or other data.

Data/information generated or captured by the mobile computing device 2500 and stored via the system 2502 may be stored locally on the mobile computing device 2500, as described above, or the data may be stored on any number of storage media that may be accessed by the device via the radio 2572 or via a wired connection between the mobile computing device 2500 and a separate computing device associated with the mobile computing device 2500, for example, a server computer in a distributed computing network, such as the Internet. Such data/information may be accessed via the mobile computing device 2500 via the radio 2572 or via a distributed computing network. Similarly, such data/information may be readily transferred between computing devices for storage and use according to well-known data/information transfer and storage means, including electronic mail and collaborative data/information sharing systems.

Figure 26:
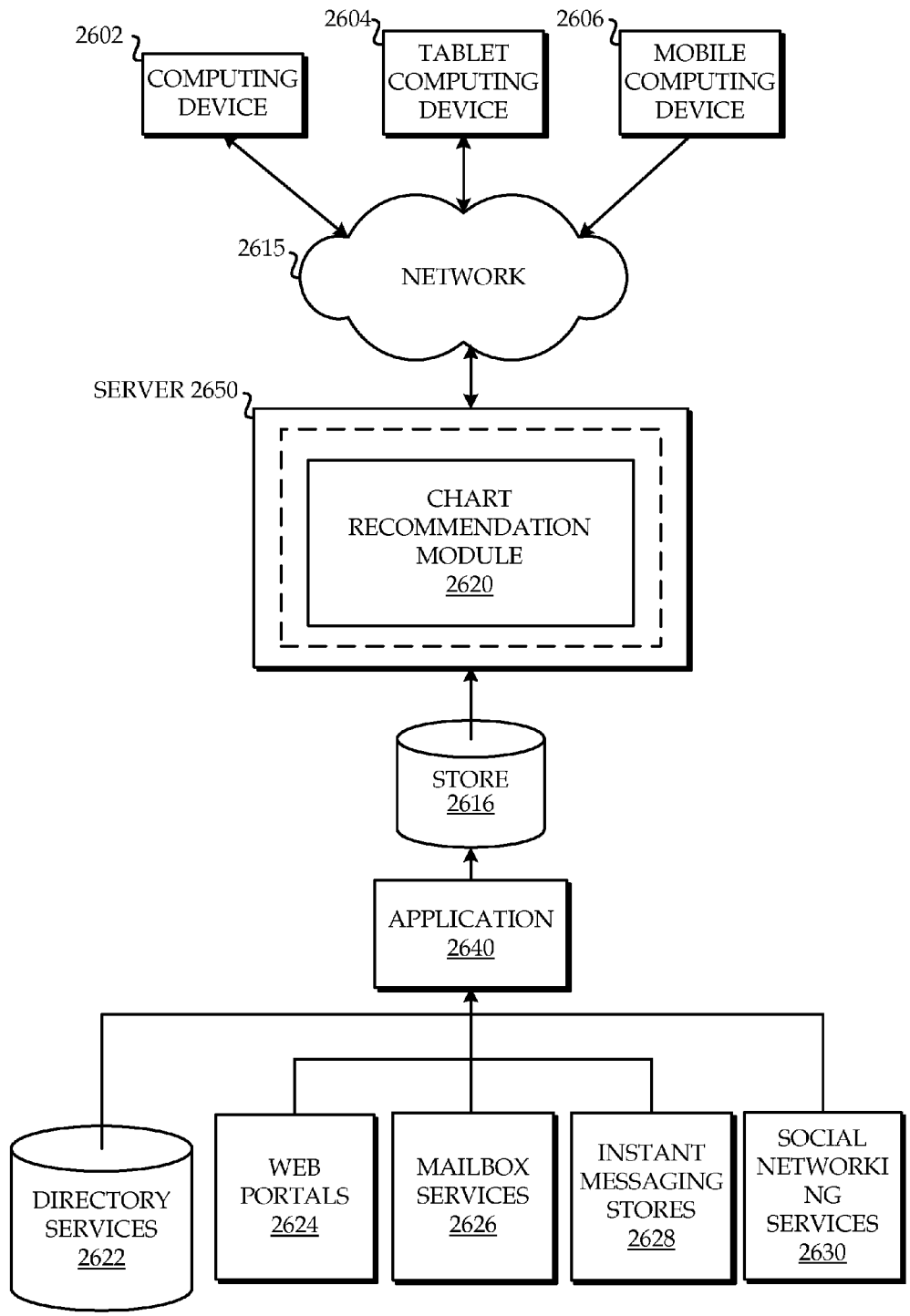
FIG. 26 is a simplified block diagram of a distributed computing system in which embodiments of the present invention may be practiced.

FIG. 26 illustrates a system architecture for providing chart recommendations, as described above. Chart recommendations developed, interacted with or edited in association with a chart recommendation module 2620 may be stored in different communication channels or other storage types. For example, chart recommendations along with information from which they are developed may be stored using directory services 2622, web portals 2624, mailbox services 2626, instant messaging stores 2628 and social networking sites 2630 and accessed by application 2640. The chart recommendation module 2620 may use any of these types of systems or the like for enabling data utilization, as described herein. A server 2650 may provide the chart recommendations to clients. As one example, server 2650 may be a web server providing chart recommendations over the web. Server 2650 may provide chart recommendations over the web to clients through a network 2615. Examples of clients that may obtain chart recommendations include computing device 2602, which may include any general purpose personal computer, a tablet computing device 2604 and/or mobile computing device 2606, such as smart phones. Any of these devices may obtain content from the store 2616.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-23. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

Those skilled in the art recognize that various modifications or variations may be made to embodiments without departing from the scope or spirit. Other embodiments are apparent to those skilled in the art from consideration of the specification and practice of the embodiments disclosed herein.

What is claimed is:

1. A method for presenting data mapping alternatives for creating a visual representation of a set of data, comprising:
receiving the set of data for analysis;
modifying the set of data to form a modified set of data;
receiving a selection of a chart type;
analyzing the modified set of data and properties associated with the modified set of data for the chart type in response to the selection of the chart type;
based on the analysis, determining data mapping alternatives for the modified set of data for the chart type, wherein determining the data mapping alternatives for the modified set of data for the chart type comprises:
determining different data orientations for the modified set of data for the chart type,
determining different series mappings for the different data orientations for the chart type, and
determining different axis mappings for the different series mappings to form a different series-axis mapping for each data mapping alternative;
ranking the data mapping alternatives based on the different data orientations, the different series-axis mappings and filtering rules; and
presenting, in a user interface, the data mapping alternatives for the chart type as applied to the modified set of data for selection based at least on the ranking.

2. The method of claim 1, wherein the data mapping alternatives are presented in a recommended charts pane.

3. The method of claim 2, further comprising:
receiving a desired selection of a desired chart from the recommended charts pane;
in response to the desired selection, presenting an alternative layouts box that provides different alternative layouts for the desired chart.

4. The method of claim 1, wherein the modified set of data for analysis is received from a data selection on an electronic spreadsheet.

5. The method of claim 1, wherein the analyzing the modified set of data and properties associated with the modified set of data further comprises determining an organization associated with the modified set of data, identifying a type of data associated with the modified set of data, and identifying a structure associated with the modified set of data.

6. The method of claim 1, wherein the analyzing the modified set of data and properties associated with the modified set of data further comprises determining a pattern associated with the modified set of data.

7. The method of claim 1, wherein determining the data mapping alternatives for the modified set of data further comprises identifying data mapping alternatives heuristically based on the modified set of data.

8. The method of claim 1, wherein the ranking the data mapping alternatives further comprises generating a score for each of the data mapping alternatives and ordering the data mapping alternatives according to the score.

9. The method of claim 8, wherein the generating the score for each of the data mapping alternatives further comprises determining how appropriate a set of categories and value series are for a data mapping.

10. The method of claim 8, wherein the generating the score for each of the data mapping alternatives further comprises determining a multiplier for each of the data mapping alternatives based on the different data orientation and the series-axis mapping associated with each of the data mapping alternatives.

11. The method of claim 1, wherein the ranking the data mapping alternatives for the modified set of data further comprises using a minimum threshold to filter out the data mapping alternatives that are below the minimum threshold.

12. A chart recommendation system, comprising:
at least one processor; and
memory encoding computer executable instructions that, when executed by the at least one processor, perform a method comprising:
receiving a set of data for analysis, the set of data comprising at least one row and at least one column in a chart;
modifying the set of data by trimming empty rows and empty columns to form a modified set of data;
receiving a selection of a chart type;
determining at least two data mapping alternatives for the modified set of data for the chart type in response to the selection of the chart type;
ranking the at least two data mapping alternatives based on data orientation, series-axis mappings and filtering rules for the chart type; and
presenting the data mapping alternatives for the chart type as applied to the modified set of data based at least on the ranking.

13. The chart recommendation system of claim 12, wherein the data mapping alternatives are presented in a recommended charts pane.

14. The chart recommendation system of claim 13, the method further comprising:
receiving a desired selection of a desired chart from the recommended charts pane;
in response to the desired selection, presenting an alternative layouts box that provides different alternative layouts for the desired chart.

15. The chart recommendation system of claim 12, wherein the at least one processor determines an organization associated with the modified set of data, identifies a type of data associated with the modified set of data, and identifies a structure associated with the modified set of data, and
wherein the at least one processor determines a pattern associated with the modified set of data.

16. The chart recommendation system of claim 12, wherein the at least one processor determines the data mapping alternatives for the modified set of data heuristically based on different data mappings and chart layouts generated for the modified set of data.

17. The chart recommendation system of claim 12, wherein the at least one processor ranks the data mapping alternatives for the modified set of data by generating a score for each of the data mapping alternatives and ordering the data mapping alternatives according the score.

18. The chart recommendation system of claim 17, wherein the at least one processor generates the score for each of the data mapping alternatives by determining how appropriate a set of categories and value series are for the chart type and data mapping, and
wherein the at least one processor filters out the data mapping alternatives having scores below a minimum threshold.

19. The chart recommendation system of claim 12, wherein the at least one processor further determines a multiplier for each of the data mapping alternatives based on the data orientation and the series-axis mapping associated with each of the data mapping alternatives.

20. A computing device, comprising:
memory for storing data; and
a processor, coupled to the memory, the processor configured to:
receive a set of data for analysis, the set of data comprising at least one row and at least one column in a chart;
receive a selection of a chart type;
modify the set of data by trimming empty rows and empty columns and addressing discontinuous ranges to form a modified set of data;
analyze the modified set of data and properties associated with the modified set of data for the chart type;
based on the analysis, determine data mapping alternatives for the modified set of data by:
determining data orientations for the modified set of data for the chart type,
determining series mappings for the modified set of data for the chart type, and
determining axis mappings for the modified set of data for the chart type;
rank the data mapping alternatives based on the data orientations, the series mappings and filtering rules for the chart type; and
present, in a user interface, the data mapping alternatives as applied to the modified set of data for selection based at least on the ranking.

* * * * *